(12) United States Patent
Bryan

(10) Patent No.: US 6,788,866 B2
(45) Date of Patent: Sep. 7, 2004

(54) LAYER MATERIALS AND PLANAR OPTICAL DEVICES

(75) Inventor: Michael A. Bryan, Los Gatos, CA (US)

(73) Assignee: NanoGram Corporation, San Jose, CA (US)

( * ) Notice: Subject to any disclaimer, the term of this patent is extended or adjusted under 35 U.S.C. 154(b) by 178 days.

(21) Appl. No.: 09/931,977

(22) Filed: Aug. 17, 2001

(65) Prior Publication Data

US 2003/0035642 A1 Feb. 20, 2003

(51) Int. Cl.$^7$ .............................. G02B 6/10; B22F 1/00; C03B 37/023

(52) U.S. Cl. ...................... 385/129; 385/130; 385/131; 385/14; 385/147; 419/37; 65/385; 65/386

(58) Field of Search ................................ 385/129, 130, 385/131, 132, 147, 14; 419/37; 65/385, 386, 443, 444

(56) References Cited

U.S. PATENT DOCUMENTS

| | | | |
|---|---|---|---|
| 3,934,061 A | 1/1976 | Keck et al. ............. 65/383 X |
| 4,038,370 A | 7/1977 | Tokimoto et al. ............. 423/336 |
| 5,085,720 A * | 2/1992 | Mikeska et al. ......... 156/89.14 |
| 5,385,594 A | 1/1995 | Kanamori et al. .......... 427/224 |
| 5,551,966 A | 9/1996 | Hirose et al. ................. 65/377 |
| 5,556,442 A | 9/1996 | Kanamori et al. ........... 63/17.4 |
| 5,622,750 A | 4/1997 | Kilian et al. ............. 427/163.2 |
| 5,850,498 A * | 12/1998 | Shacklette et al. .......... 385/129 |
| 5,863,604 A | 1/1999 | Hunt et al. ............... 427/248.1 |
| 5,874,134 A | 2/1999 | Rao et al. .................... 427/446 |
| 5,885,904 A | 3/1999 | Mehta et al. ............... 438/758 |
| 5,958,348 A | 9/1999 | Bi et al. ................. 422/186.04 |
| 5,993,677 A | 11/1999 | Biasse et al. ................. 216/36 |
| 5,997,956 A | 12/1999 | Hunt et al. .................. 427/450 |
| 6,027,988 A | 2/2000 | Cheung et al. ............. 438/513 |
| 6,113,735 A | 9/2000 | Chu et al. .................... 156/345 |
| 6,120,660 A | 9/2000 | Chu et al. ............... 204/298.15 |
| 6,245,849 B1 * | 6/2001 | Morales et al. ............. 524/442 |
| 6,254,928 B1 | 7/2001 | Doan .......................... 427/212 |
| 6,280,802 B1 | 8/2001 | Akedo et al. ............... 427/561 |
| 6,309,580 B1 * | 10/2001 | Chou .......................... 264/338 |
| 6,387,531 B1 | 5/2002 | Bi et al. ...................... 427/370 |
| 6,472,459 B2 * | 10/2002 | Morales et al. ............. 524/439 |

FOREIGN PATENT DOCUMENTS

| | | | |
|---|---|---|---|
| WO | WO 99/61244 | 12/1999 | ............. 385/147 X |
| WO | WO 00/10920 | 3/2000 | ............. 385/147 X |
| WO | WO 00/32839 | 6/2000 | ............. 385/147 X |
| WO | WO 01/07155 | 2/2001 | ............. 385/147 X |
| WO | WO 02/32588 | 4/2002 | ............. 385/147 X |

OTHER PUBLICATIONS

Bryan, "Layer Materials and Planar Optics Devices", U.S. patent application Publication No. U.S. 2003/0035642 A1, published Feb. 20, 2003.*

(List continued on next page.)

Primary Examiner—Brian M. Healy
(74) Attorney, Agent, or Firm—Patterson, Thuente, Skaar & Christensen, P.A.; Peter S. Dardi

(57) ABSTRACT

Structures include a substrate with a release layer on the surface of the substrate and a uniform material over the release layer. The release layer generally includes powders or partly sintered powders. In some embodiments the uniform material is an optical material, which can be a glass. The optical material can be mechanically decoupled fro the substrate such that the optical material is stress free. The release layer can function as a transfer layer for transferring the uniform material to another substrate of separating the uniform material to create a freestanding structure. The release layer can be formed by the deposition of a material with a higher sintering temperature than powders used to form the uniform material. In other embodiments, a heating step is performed to preserve the release layer while consolidating powders on top into the uniform material.

41 Claims, 15 Drawing Sheets

OTHER PUBLICATIONS

Morales et. al., "Fabrication of Metallic Microstructures . . . ", U.S. patent application Publication No., U.S. 2001/0038803 A1, published Nov. 8, 2001.*

Barbarossa et al., "Effect of temperature gradient on sintering kinetics of doped silica waveguides by flame hydrolysis deposition", SPIE vol. 1794 Integrated Optical Circuite II, pp. 191–197, 1992.

Lebedev et al., "Laser distillation–deposition synthesis of silica glasses with variable concentrations of oxygen deficient centers", SPIE vol. 2498, pp. 65–71, 1995.

Rabii et al., "Recent advances in the fabrication of hollow glass vaveguides", SPIE vol. 3262, pp. 103–107, 1998.

Liang et al., "Laser synthesize silicon–based and ferro–based nano powders", SPIE vol. 3862, pp. 17–21, 1999.

* cited by examiner

LAYER MATERIALS AND PLANAR OPTICAL DEVICES

BACKGROUND OF THE INVENTION

The invention relates to materials, especially optical materials, formed on a substrate surface in which stress within the material is reduced or eliminated by the placement or inclusion of a decoupling layer between the material and the substrate surface. The invention further relates to optical devices and integrated optical circuits incorporating optical materials located on a decoupling layer. In addition, the invention relates to methods for the production of optical materials on a stress relieving layer, the production of the stress relieving layer and integrated optical devices incorporating the stress relieved optical materials.

The consolidation or integration of mechanical, electrical and optical components into integral devices has created enormous demands on material processing. Furthermore, the individual components integrated in the devices are shrinking in size due to new materials and new technologies. Therefore, there is considerable interest in the formation of specific compositions applied to substrates. In order to form optical devices with high quality optical coatings from these materials, the coatings must be highly uniform. Interest in forming highly uniform materials for these coatings has sparked the development of processes for producing optical coatings.

Presently used optical communication light wavelengths are from less than about 0.6 microns to more than about 1.6 microns. Optical waveguides generally have dimensions larger than the wavelength used. Thus, optical structures can have dimensions from less than a few microns to more than about 100 microns depending on optical mode requirements, design, function and other factors.

An explosion of communication and information technologies including internet-based systems has motivated a worldwide effort to implement fiber optical communication networks to take advantage of a very large potential bandwidth. The capacity of optical fiber technology can be expanded further with implementation of Dense Wavelength Division Multiplexing (DWDM) technology. With increasing demands more channels are needed to fulfill the system functions. Integrated components can be used to replace discrete optical components to supply the desired capacity.

Optical components can be integrated onto a planar chip-type base analogous to an electronic integrated circuit. By placing the optical components onto an integrated chip with a substrate, such as a silicon wafer, many optical components can be highly integrated into a compact structure with a small footprint. For the mass production of these integrated optical chips, existing semiconductor technology, such as lithography and dry etching, can be involved advantageously in appropriate steps of the production process.

The production of integrated optical components requires the deposition of high quality optical materials onto the substrate surface. Furthermore, the optical materials must be fashioned into specific devices. In particular, a significant technology for the integration of optical components centers around the production of planar waveguides. Semiconductor or similar approaches have been used to form the waveguides following the deposition of optical materials.

Basic characteristics of optical film coatings include surface quality, film uniformity and optical quality. Optical quality refers to many properties including absorption, scattering, loss and transmission. Optical quality also includes the uniformity of optical properties, such as index of refraction, and low bi-refringence. In addition, optical quality includes interface quality, such as the interface between the core layers and cladding layers. Current benchmarks are established, for example, by glass fibers, planar waveguide glass, lithium niobate, and InP. For silica ($SiO_2$) glass forms generally have the highest optical quality, while for other materials single crystal forms have the highest quality optical transmission.

Several approaches have been used and/or suggested for the deposition of the optical materials. These approaches include, for example, flame hydrolysis deposition (FHD), chemical vapor deposition (CVD), physical vapor deposition (PVD), sol-gel chemical deposition and ion implantation. FHD and CVD are two common methods for commercial implementation of planar waveguides. Flame hydrolysis and forms of chemical vapor deposition have also been successful in the production of glass fibers for use as fiber optic elements. Flame hydrolysis deposition involves the use of a hydrogen-oxygen flame to react gaseous precursors to form particles of the optical material as a coating on the surface of the substrate. Subsequent heat treatment of the coating can result in the formation of a uniform optical material, which generally is a glass material. The next generations of integrated optical components will have stricter tolerances for uniformity and purity.

Approaches have been developed for the production of highly uniform submicron and nanoscale particles by laser pyrolysis. Highly uniform particles are desirable for the fabrication of a variety of devices including, for example, batteries, polishing compositions, catalysts, and phosphors for optical displays. Laser pyrolysis involves an intense light beam that drives a chemical reaction of a reactant stream to form highly uniform particles following the rapid quench of the stream after leaving the laser beam. Laser pyrolysis approaches have been adapted for the production of highly uniform optical materials on substrate surface using an approach called light reactive deposition.

SUMMARY OF THE INVENTION

In a first aspect, the invention pertains to a structure comprising a substrate having a surface, a release layer on the surface of the substrate and a first uniform material on top of the release layer. The release layer includes powders or partly sintered powders. The invention further includes a method for transferring a layer of optical material to a receiving substrate surface. The method involves applying separation forces to transfer to the receiving substrate a uniform material from a transfer material in contact with the receiving substrate surface. The transfer material includes a substrate having a surface, a release layer on the surface of the substrate and a first uniform material on top of the release layer. The layer of transferred material includes the first uniform material of the transfer material.

In another aspect, the invention pertains to a structure comprising a substrate having a surface and an optical material having a thickness from about 3 microns to about 50 microns, which is located on a substrate surface. In this structure, the optical material is free of stress.

In a further aspect, the invention pertains to a method for forming a structure with a uniform material on a substrate with a release layer between the uniform material and the substrate. The method includes depositing a layer of powder on a substrate and heating the powder layers. The powder in the layer has a lower sintering temperature at the top than the powder in the layer adjacent the substrate. The heating of the powder layers converts the top of the powder layer to a uniform material while the powder layer adjacent the substrate becomes a release layer.

In an additional aspect, the invention pertains to another method for forming a uniform material on a substrate surface with a release layer between the uniform material and the substrate. This method includes heating a powder coating on the surface of the substrate from above to produce the uniform material the surface and a release layer between the substrate surface and the uniform optical material.

Furthermore, the invention pertains to a substrate-less planar optical structure comprising a plurality of optical glass layers with different indices-of-refraction from each other. A thickness through the entire structure is no more than about 1 mm. Also, a planar projection of the structure with a maximum surface area has a minimum edge-to-edge distance of a segment passing through the center of the projected area of at least about 1 cm.

DETAILED DESCRIPTION OF THE ILLUSTRATIVE EMBODIMENTS

Figure 1:
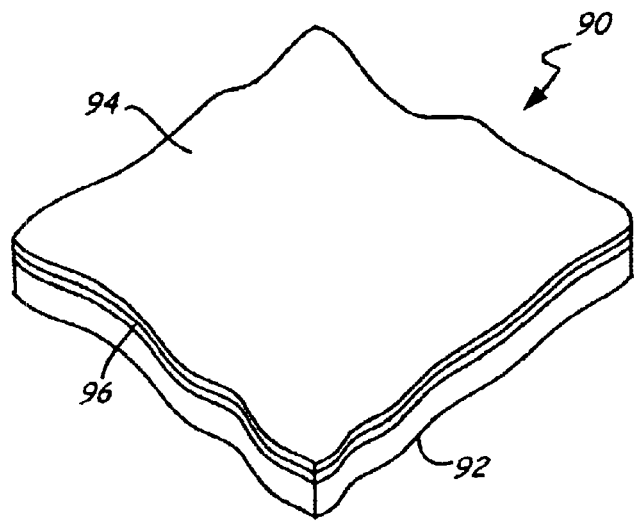
FIG. 1 is a fragmentary perspective view of a substrate with a release layer and optical layer over the sintered powder layer.

Improved structures incorporate a uniform material, such as an optical material, on a substrate surface with a release layer between at least a portion of the optical material and the substrate surface. The release layer can function as a mechanical decoupling layer. With optical materials, the release layer relieves mechanical stress from forming in the optical material while the optical material is being consolidated and densified during heat treatment and subsequent cooling. The release layer can also be a mechanical release layer to enable some or all of the device to be separated from the substrate under the release layer. With a mechanical release layer, a substrateless planar optical structure can be formed. The release layer generally includes powders and/or partly sintered powders.

Mechanical stresses can develop due to differences in thermal expansion coefficients of adjacent materials. Release layers are selectively deposited to form following consolidation a uniform material, which can be a glass or crystalline material, adjacent an underlying release layer. Silica-based glasses are of particular interest.

If the release layer functions as a mechanical release layer, the structures with a uniform material and an underlying release layer can be used as transfer material to transfer a layer of uniform material to another substrate or to form a substrateless planar structure, such as an integrated planar optical structure. The use of a mechanical release layer can aid, for example, in packaging where a portion of an optic component can be moved in the out-of-plane dimension for connection with devices out of the planar structure.

Optical communication approaches are growing in use due to the availability of wide bandwidth in available optical transmission. Optical communication systems are generally built around fiber optic systems. It is desirable, however, to place optical devices onto substrate surfaces to increase the integration of the devices. Integrated optical components can be formed in analogy with integrated electrical circuits. Integrated optical-electronic circuits can also be formed.

Material processing remains a significant consideration in the design of desired optical devices. For example, the composition and properties, such as density, of a material are adjusted to obtain materials with a desired index-of-refraction. Similarly, the thermal expansion and flow temperatures of a material have to be consistent with a reasonable processing approach for forming the materials into a monolithic, integrated structure. The consolidated optical materials can have good optical properties such that light transmission through the materials does not result in undesirable amount of loss. In addition, the materials have to be processable to form the integrated devices of the integrated optical circuit or electro-optical circuit. Similar material constraints can be problematic for the formation of state-of-the-art integrated electronic devices.

When forming monolithic structures built upon a substrate, different materials are generally applied in layers adjacent each other. Different materials have different coefficients of thermal expansion. During processing, the structures are generally heated and cooled to anneal CVD films or to consolidate the optical materials from FHD or LRD. During cooling, stresses can result due to, among other factors, the different coefficients of thermal expansion. For example, stresses in optical materials can result in bi-refringence. Bi-refringence in an optical material leads to some degree of polarization of transmitted light. Polarization generally is undesirable because it can lead to optical losses or to other optical effects that affect optical performance. In general, optical components can be polarization independent. Thus, the component is not designed to operate only with a particular polarization state of the incident light. The optical devices can be insensitive to the incident polarization state of the light.

The structures described herein have release layer between a uniform material and an underlying substrate. Since the release layer is not strongly mechanically coupled to the overlying consolidated uniform layers, the layer can adjust or conform to eliminate stresses during the processing steps. The processing is controlled to prevent the consolidation of the release layer into a uniform material that would then introduce stresses into the adjacent materials. Such control may not be particularly difficult if the powder, due to composition, particle size or other property, in the release layer has a sintering temperature well above the sintering temperature of the optical materials. A representative structure is shown in FIG. 1. Structure 90 includes a substrate 92, a uniform material 94 and release layer 96 between substrate 92 and uniform materials 94. The uniform material can be substantially stress-free.

In some embodiments, layers of stress reduced uniform materials are etched to form devices, such as optical devices, on the surface. For optical devices, each optical device generally includes a plurality of optical layers. The stacked optical layers generally have similar compositions, such that they have similar coefficients of thermal expansion. Therefore, significant stress generally does not develop between different optical layers. In contrast, the compositions of the substrate and the optical materials are generally significantly different such that the coefficients of thermal expansion are correspondingly different. The optical layer facing the substrate is located upon a release layer. Additional optical materials can be deposited and etched to form integrated optical devices involving one or more optical materials adjacent each other along the substrate surface. In some embodiments, each of the optical materials is stress reduced, due to the presence of release layer between optical materials and the substrate.

The generation of the stress reduced structures described herein generally relies on the formation of particle coatings for further processing. Flame hydrolysis deposition is an established approach for the formation of particle/powder coatings for consolidation into silica-based optical glasses. Flame hydrolysis involves chemical reaction in a hydrogen/oxygen flame.

Recently, a new approach called light reactive deposition has been developed for the formation of powder/particle coatings for consolidation into optical materials. Light reactive deposition can be performed at high deposition rates with the capability of producing extremely smooth and uniform coatings and with the versatility of incorporating a wide range of compositions for deposition. Light reactive deposition uses an intense light beam to drive a chemical reaction to produce particles within a well-defined reaction zone that overlaps with the light beam. High production rates are possible using an elongated reactant inlet that is aligned with the light beam such that the reaction zone is extended along the elongated reactant stream. A segment of the substrate can be coated simultaneously by a corresponding elongated product stream. The coating can be performed within the reaction chamber.

After the deposition of the particles/powders, the particles are processed into high quality uniform materials. The particles can be one layer of uniform composition or multiple layers with different compositions/dopants and/or particle sizes. In particular, the particles used to form the release layer may or may not have the same chemical composition as the particles/powders that are consolidated to form the uniform material. Generally, the particles used to form the release layer have a different composition from the particles consolidated into the uniform material. In addition, multiple layers of powders can be deposited for the formation of multiple layers upon consolidation. In any case, the coated substrate is processed under conditions such that a release layer is formed between a uniform layer and a substrate.

Before or after consolidation of the powders into a uniform material with an underlying release layer, the coatings can be etched to form structures with the coatings. The etching can be performed using various approaches such as photolithography and dry etching. The etching may or may not involve removal of the release layer.

Generally, a single optical device includes several layers of optical materials. For example, an optical waveguide has a core layer forming the waveguide on an underclading layer and covered by an overcladding layer. Generally, the different optical materials have similar compositions and, correspondingly, coefficients of thermal expansion. Powder layers or partially sintered powder layers would interfere with the optical properties of the device if they were located between optical layers. Thus, the powder layers or partially sintered powders generally are only located between a bottom layer of optical material and a substrate or between optically isolated optical devices in different layers. Possible optical devices formed following etching and consolidation include, for example, planar waveguides, optical amplifiers, optical couplers, and the like.

To form one or more devices of a particular optical material or materials, an integrated optical circuit can be formed by the deposition of one or more additional coatings of powders. The additional coatings can be consolidated together or sequentially. Similarly, a single etching can be performed following the deposition and, generally, consolidation of the different materials, or multiple etchings can be performed with subsequent coating layers deposited after one or more etchings. Generally, the additional powder coatings have a different composition from the compositions in the optical materials of the first device. However, processing conditions can be changed to alter the optical properties, such as index-of-refraction without changing composition. Similarly, one or more layers of a first device may have identical optical properties as layers on the second device. A plurality of powder coatings can be consolidated simultaneously or sequentially to form a multi-layered optical device with a release layer between the resulting optical device and an underlying material or substrate.

The second optical device can be in optical contact with the first optical device. With devices in optical contact with each other, light transmitted through one device can pass into the second device. The process can be continued to add additional devices that are optically connected or integrated to form an optical circuit.

Besides acting to mechanically decouple adjacent materials, a release layer can function as a transfer layer, which mechanically releases to separate the substrate from the materials deposited on the substrate. When functioning as a transfer layer, a uniform material on a release layer is placed in contact with a receiving surface. Forces are then applied to separate the release layer and to release the uniform material. Suitable separation forces can include, for example, heat, cold, pressure, solvation and/or shear forces. Transfer can be facilitated by the application of an adhesive to the receiving layer. Alternatively, the device can be used as a free space structure, such as a planar, substrateless optical structure. A substrateless planar optical structure has the advantage that it can be thermally isolated from other surfaces, and the temperature of the structure can be controlled fairly easily. Additional processing generally takes place following transfer to the receiving layer. While optical materials are of particular interest, the materials and processes can be used for forming non-optical materials also.

Coating Formation

Light reactive deposition is a coating approach that uses an intense light source to drive synthesis of desired compositions from a flowing reactant stream. Light reactive deposition generally results in deposition of powders, although hot particles deposited on the surface can partly fuse during the deposition process due to their temperature. Light reactive deposition has similarities with laser pyrolysis for powder synthesis in that an intense light source drives the reaction. Laser pyrolysis involves a flowing reactant stream that intersects with an intense light beam at a reaction zone where reaction products form particles. While the particles produced in laser pyrolysis are collected for subsequent use, in light reactive deposition, the resulting compositions are directed to a substrate surface where a coating is formed. The characteristics of laser pyrolysis that lead to the production of highly uniform particles can be correspondingly implemented in the production of coatings with high uniformity.

In light reactive deposition, the coating of the substrate can be performed in a coating chamber separate from the reaction chamber or the coating can be performed within the reaction chamber. In either of these configurations, the reactant delivery system can be configured similarly to a reactant delivery system for a laser pyrolysis apparatus for the production of particles with various compositions. Thus, a wide range of coatings can be formed for further processing into optical materials.

If the coating is performed in a coating chamber separate from the reaction chamber, the reaction chamber is essentially the same as the reaction chamber for performing laser pyrolysis, although the reactant throughput and the reactant stream size may be designed to be appropriate for the coating process. For these embodiments, the coating chamber and a conduit connecting the coating chamber with the reaction chamber replace the collection system of the laser pyrolysis system. If the coating is performed within the reaction chamber, a substrate intercepts a flow from the reaction zone to directly deposit particles onto a substrate.

A laser pyrolysis apparatus design incorporating an elongated reactant inlet has been developed that facilitates production of commercial quantities of particles. This design has been described in U.S. Pat. No. 5,958,348 to Bi et al., entitled "Efficient Production of Particles by Chemical Reaction," incorporated herein by reference. Additional embodiments and other appropriate features for commercial capacity laser pyrolysis apparatuses are described in copending and commonly assigned U.S. patent application Ser. No. 09/362,631 to Mosso et al., entitled "Particle Production Apparatus," incorporated herein by reference. These designs for commercial production of powders by laser pyrolysis can be adapted for rapid coating of high quality optical materials by light reactive deposition.

In some embodiments of a high capacity laser pyrolysis apparatus, the reaction chamber and reactant inlet are elongated significantly along the light beam to provide for an increase in the throughput of reactants and products. The delivery of gaseous/vapor reactants and/or aerosol reactants, as described further below, can be adapted for the elongated reaction chamber design. The size of the elongated reactant inlet can be selected based on the size of the substrate to be coated.

In general, the particle production apparatus with the elongated reaction chamber and reactant inlet is designed to reduce contamination of the chamber walls, to increase the production capacity and to make efficient use of resources. To accomplish these objectives, the elongated reaction chamber can provide for an increased throughput of reactants and products without a corresponding increase in the dead volume of the chamber. The dead volume of the chamber can become contaminated with unreacted compounds and/or reaction products. Furthermore, an appropriate flow of shielding gas confines the reactants and products within a flow stream through the reaction chamber. The high throughput of reactants makes efficient use of the light energy.

Figure 2:
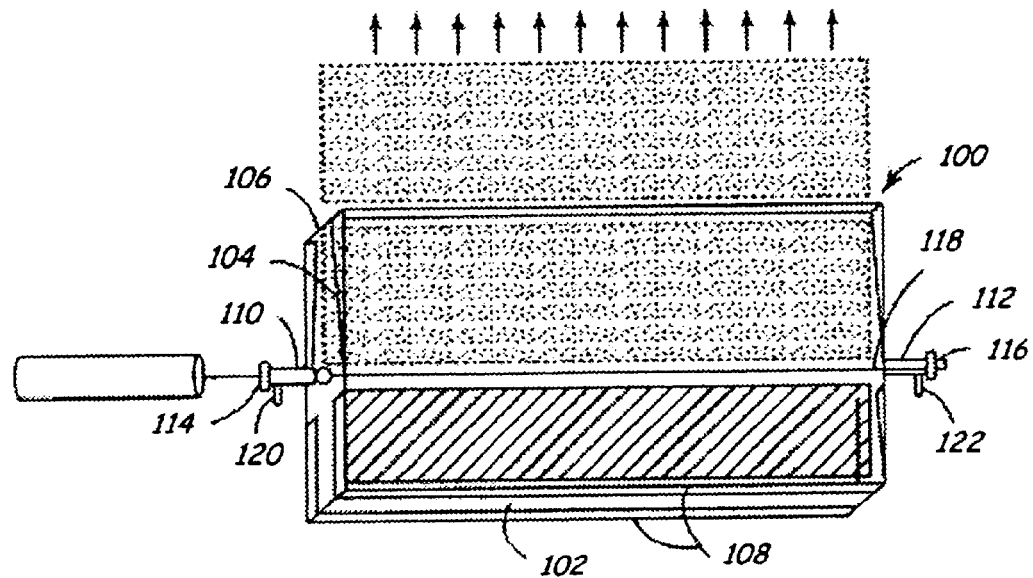
FIG. 2 is a side perspective view of a reaction chamber for performing laser pyrolysis synthesis of powders at high production rates.

The design of the improved reaction chamber 100 is shown schematically in FIG. 2. A reactant inlet 102 leads to main chamber 104. Reactant inlet 102 conforms generally to the shape of main chamber 104. Main chamber 104 includes an outlet 106 along the reactant/product stream for removal of particulate products, any unreacted gases and inert gases. Shielding gas inlets 108 are located on both sides of reactant inlet 102. Shielding gas inlets are used to form a blanket of inert gases on the sides of the reactant stream to inhibit contact between the chamber walls and the reactants or products. The dimensions of elongated reaction chamber 104 and reactant inlet 102 can be designed for high efficiency particle production. Reasonable dimensions for reactant inlet 102 for the production of nanoparticles, when used with a $CO_2$ laser with a power in the several kilowatt range, are from about 5 mm to about 1 meter.

Tubular sections 110, 112 extend from the main chamber 104. Tubular sections 110, 112 hold windows 114, 116 to define a light beam path 118 through the reaction chamber 100. Tubular sections 110, 112 can include inert gas inlets 120, 122 for the introduction of inert gas into tubular sections 110, 112.

Outlet 106 can lead to a conduit directed to a coating chamber. There is not necessarily a change in dimension that demarcates a transition from the reaction chamber to a conduit to the coating chamber. The reaction zone is located within the reaction chamber, and the conduit can but not necessarily involves a change in direction of the flow.

Figure 3:
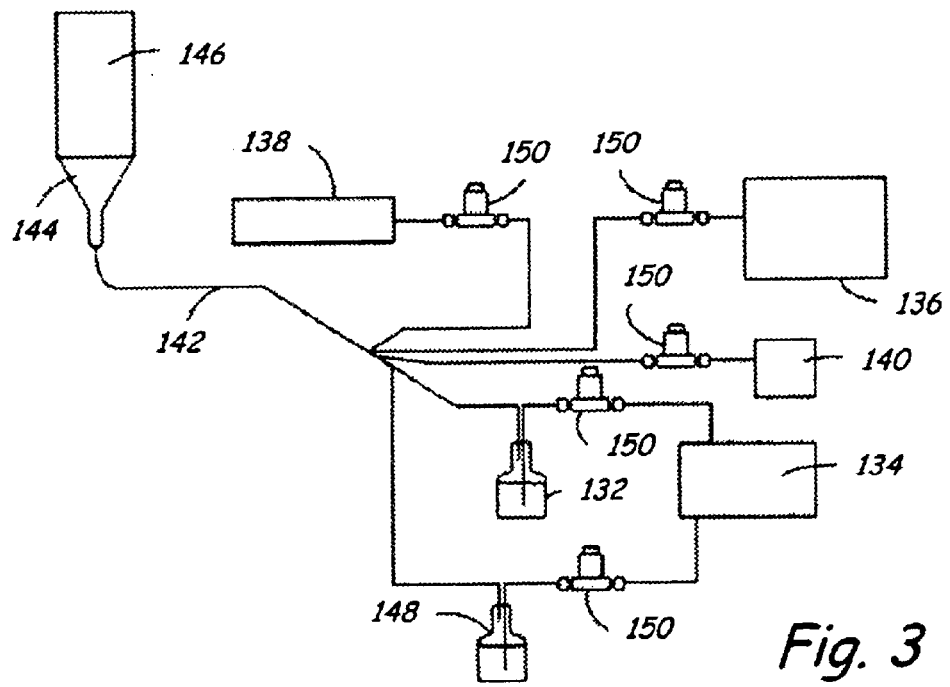
FIG. 3 is a schematic representation of a reactant delivery system for the delivery of vapor/gas reactants to a flowing reaction system, such as the laser pyrolysis reactor of FIG. 2.

The reactant inlet is generally connected to a reactant delivery system. Referring to FIG. 3, an embodiment 130 of a reactant delivery apparatus includes a source 132 of a precursor compound. For liquid or solid reactants, a carrier gas from one or more carrier gas sources 134 can be introduced into precursor source 132 to facilitate delivery of the reactant. Precursor source 132 can be a liquid holding container, a solid precursor delivery apparatus or other suitable container. The carrier gas from carrier gas source 134 can be, for example, either an infrared absorber, an inert gas or mixtures thereof.

The gases/vapors from precursor source 132 can be mixed with gases from infrared absorber source 136, inert gas source 138 and/or gaseous reactant source 140 by combining the gases in a single portion of tubing 142. The gases are combined a sufficient distance from the reaction chamber such that the gases become well mixed prior to their entrance into the reaction chamber. The combined gas in tube 142 passes through a duct 144 into channel 146, which is in fluid communication with a reactant inlet, such as 102 in FIG. 2.

A second reactant can be supplied as a vapor from second reactant source 148, which can be a liquid reactant delivery apparatus, a solid reactant delivery apparatus, a gas cylinder or other suitable container or containers. As shown in FIG. 3, second reactant source 148 delivers a second reactant to duct 144 by way of tube 142. Alternatively, second reactant source can deliver the second reactant into a second duct such that the two reactants are delivered separately into the reaction chamber where the reactants combine at or near the reaction zone. Mass flow controllers 150 can be used to regulate the flow of gases/vapors within the reactant delivery system of FIG. 3. Additional reactants can be provided similarly.

As noted above, the reactant stream can include one or more aerosols. The aerosols can be formed within the reaction chamber or outside of the reaction chamber prior to injection into the reaction chamber. If the aerosols are produced prior to injection into the reaction chamber, the aerosols can be introduced through reactant inlets comparable to those used for gaseous reactants, such as reactant inlet 102 in FIG. 2.

Figure 4:
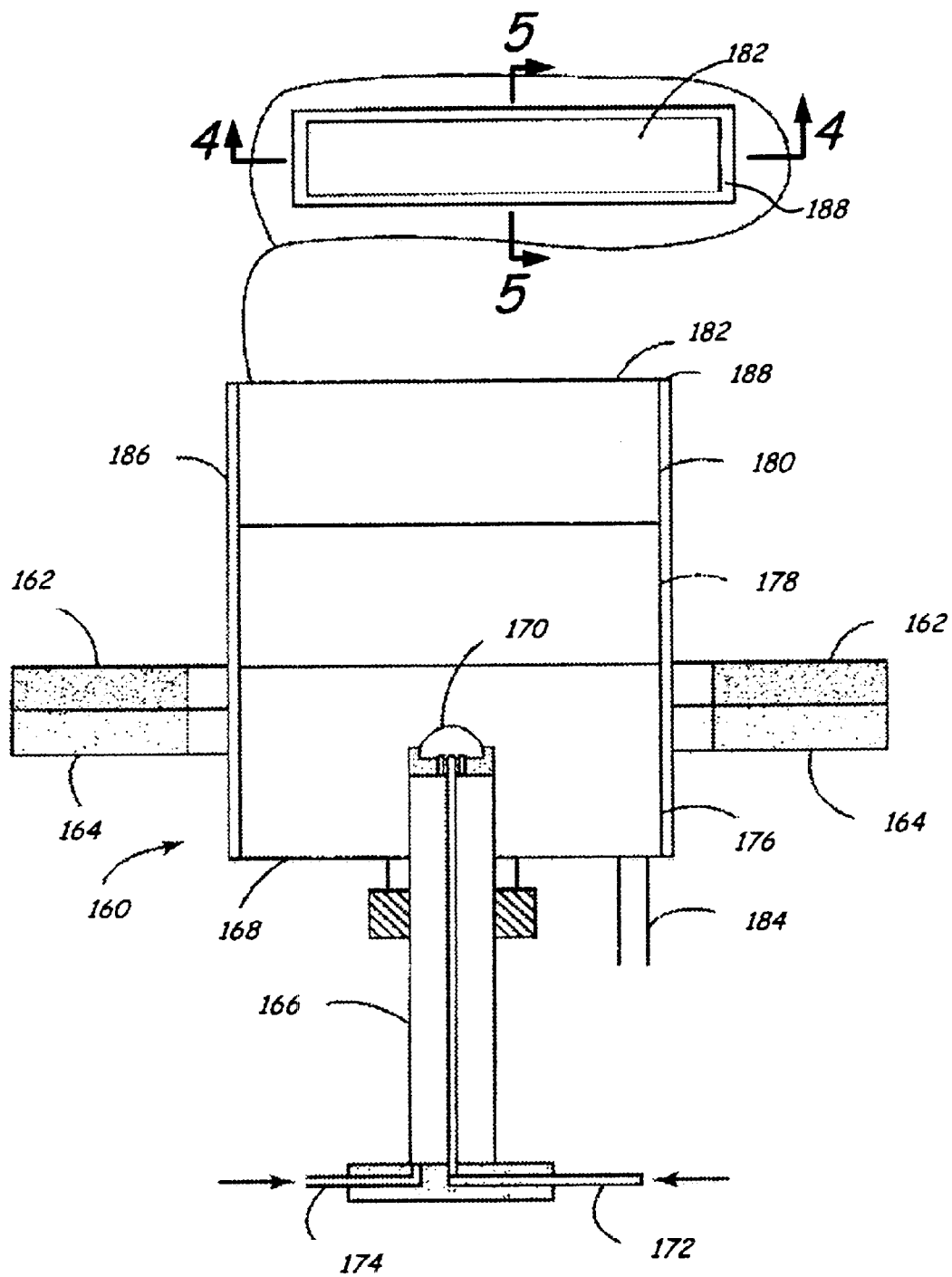
FIG. 4 is a sectional side view of a reactant inlet nozzle with an aerosol generator for the delivery of aerosol and gas/vapor compositions into a reaction chamber, wherein the cross section is taken along line 4—4 of the insert. The insert shows a top view of an elongated reactant inlet.
Figure 5:
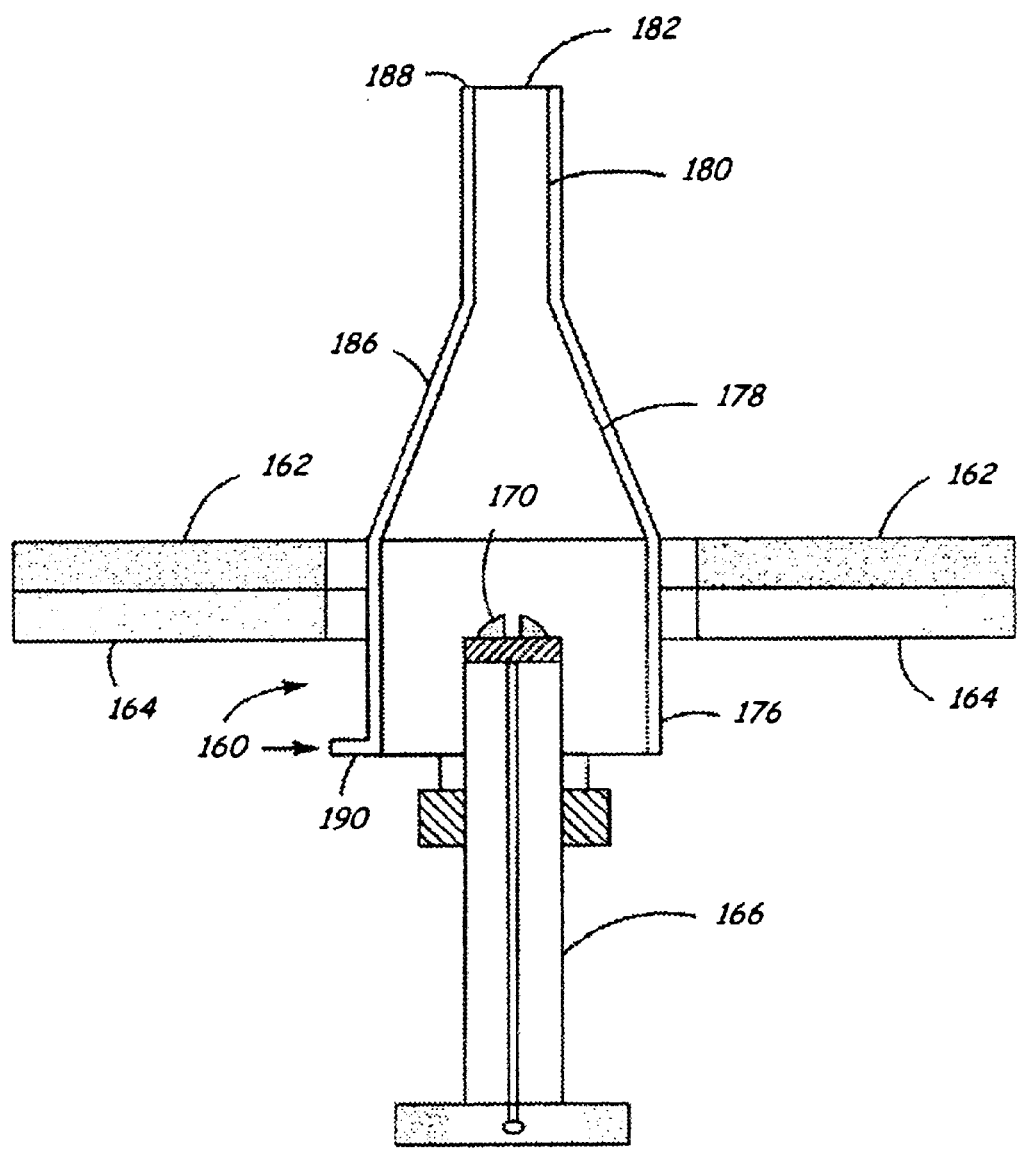
FIG. 5 is a sectional side view of the reactant inlet nozzle of FIG. 4 taken along the line 5—5 of the insert in FIG. 4.

An embodiment of a reactant delivery nozzle configured to deliver an aerosol reactant is shown in FIGS. 4 and 5. Inlet nozzle 160 connects with a reaction chamber at its lower surface 162. Inlet nozzle 160 includes a plate 164 that bolts into lower surface 162 to secure inlet nozzle 160 to the reaction chamber. Inlet nozzle 160 includes an inner nozzle 166 and an outer nozzle 168. Inner nozzle 166 can have, for example, a twin orifice internal mix atomizer 170 at the top of the nozzle. Suitable gas atomizers are available from Spraying Systems, Wheaton, Ill. The twin orifice internal mix atomizer 170 has a fan shape to produce a thin sheet of aerosol and gaseous compositions. Liquid is fed to the atomizer through tube 172, and gases for introduction into the reaction chamber are fed to the atomizer through tube 174. Interaction of the gas with the liquid assists with droplet formation.

Outer nozzle 168 includes a chamber section 176, a funnel section 178 and a delivery section 180. Chamber section 176 holds the atomizer of inner nozzle 166. Funnel section 178 directs the aerosol and gaseous compositions into delivery section 180. Delivery section 180 leads to a rectangular reactant opening 182, shown in the insert of FIG. 4. Reactant opening 182 forms a reactant inlet into a reaction chamber for laser pyrolysis or light reactive deposition. Outer nozzle 168 includes a drain 184 to remove any liquid that collects in the outer nozzle. Outer nozzle 168 is covered by an outer wall 186 that forms a shielding gas opening 188 surrounding reactant opening 182. Inert shielding gas is introduced through tube 190. Additional embodiments for the introduction of an aerosol with one or more aerosol generators into an elongated reaction chamber is described in commonly assigned and copending U.S. Pat. No. 6,193,939 to Gardner et al., entitled "Reactant Delivery Apparatuses," incorporated herein by reference.

For the formation of oxides, suitable secondary reactants serving as an oxygen source include, for example, $O_2$, CO, $N_2O$, $H_2O$, $CO_2$, $O_3$ and mixtures thereof. Molecular oxygen can be supplied as air. Alternatively, oxygen can be provided in a metal/metalloid precursor compound, such as a carbonyl. Some sources of carbon for carbides, nitrogen for nitrides and sulfur for sulfides are described further below. A secondary reactant compound, if present, should not react significantly with the metal precursor prior to entering the reaction zone since this generally would result in the formation of large particles.

Laser pyrolysis/light reactive deposition can be performed with a variety of optical frequencies, using either a laser or other strong focused light source. Some desirable light sources operate in the infrared portion of the electromagnetic spectrum. $CO_2$ lasers are particularly convenient sources of light. Infrared absorbers for inclusion in the reactant stream include, for example, $C_2H_4$, isopropyl alcohol, $NH_3$, $SF_6$, $SiH_4$ and $O_3$. $O_3$ can act as both an infrared absorber and as an oxygen source. The radiation absorber, such as the infrared absorber, absorbs energy from the radiation beam and distributes the energy to the other reactants to drive the reaction.

Generally, the energy absorbed from the light beam increases the temperature at a tremendous rate, many times the rate that heat generally would be produced by exothermic reactions under controlled condition. While the process generally involves nonequilibrium conditions, the temperature can be described approximately based on the energy in the absorbing region. In light reactive deposition, the reaction process is qualitatively different from the process in a combustion reactor where an energy source initiates a reaction, but the reaction is driven by energy given off by an exothermic reaction. In a combustion reactor, there is generally no well defined reaction zone with a boundary. The reaction zone is large and the residence time of the reactants is long. Lower thermal gradients are generally present in the combustion reactor. In contrast, the laser/light driven reactions have extremely high heating and quenching rates. The laser/light intensity is controllable such that the reaction conditions are similarly controllable.

An inert shielding gas can be used to reduce the amount of reactant and product molecules contacting the reactant chamber components. Inert gases can also be introduced into the reactant stream as a carrier gas and/or as a reaction moderator. Appropriate inert shielding gases include, for example, Ar, He and $N_2$.

The laser pyrolysis apparatuses can be adapted for light reactive deposition. The nature of the adaptation depends on whether or not the coating is performed in the reaction chamber or within a separate coating chamber. In any of the embodiments, the reactant delivery inlet into the reaction chamber generally is configured to deliver a reactant stream with dimensions that results in a product stream with desired dimensions for the deposition process. For example, in some embodiments, the reactant inlet has a width approximately the same size or slightly larger than the width of a substrate such that the substrate can be coated along its entire width with one pass through the product stream without wasting excessive amount of product.

Figure 6:
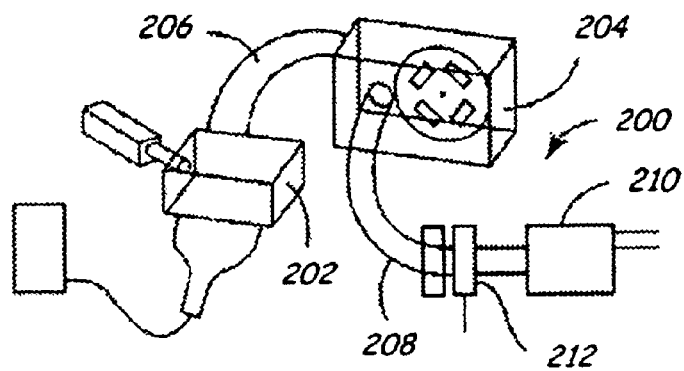
FIG. 6 is a schematic diagram of a light reactive deposition apparatus formed with a particle production apparatus connected to a separate coating chamber through a conduit.

The outlet of a laser pyrolysis apparatus can be adapted for the coating of substrates within a separate coating chamber. A coating apparatus with separate reaction chamber and coating chamber is shown schematically in FIG. 6. The coating apparatus 200 comprises a reaction chamber 202, a coating chamber 204, a conduit 206 connecting reaction chamber 202 with coating chamber 204, an exhaust conduit 208 leading from coating chamber 204 and a pump 210 connected to exhaust conduit 208. A valve 212 can be used to control the flow to pump 210. Valve 212 can be, for example, a manual needle valve or an automatic throttle valve. Valve 212 can be used to control the pumping rate and the corresponding chamber pressures. A collection system, filter, scrubber or the like 214 can be placed between the coating chamber 204 and pump 210 to remove particles that did not get coated onto the substrate surface.

Figure 7:
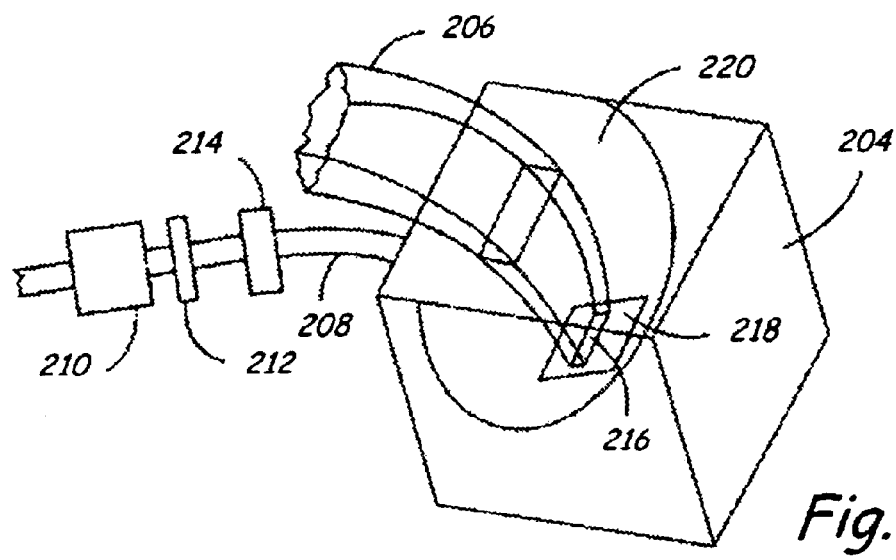
FIG. 7 is a perspective view of a coating chamber where the walls of the chamber are transparent to permit viewing of the internal components.

Referring to FIG. 7, conduit 206 from the particle production apparatus 202 leads to coating chamber 204. Conduit 206 terminates at opening 216 within chamber 204. In some embodiments, conduit opening 216 is located near the surface of substrate 218 such that the momentum of the particle stream directs the particles directly onto the surface of substrate 218. Substrate 218 can be mounted on a stage or other platform 220 to position substrate 218 relative to opening 216.

Figure 8:
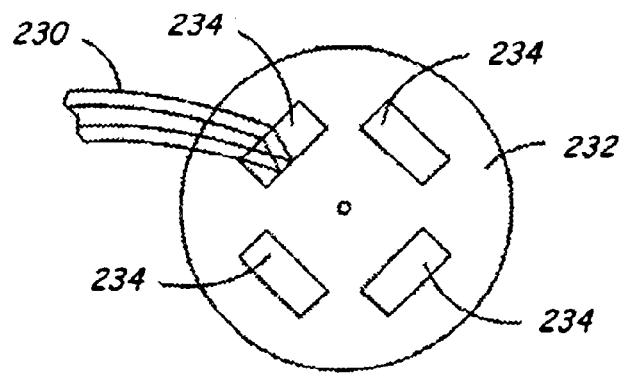
FIG. 8 is perspective view of a particle nozzle directed at a substrate mounted on a rotating stage.

An embodiment of a stage to position a substrate relative to the conduit from the particle production apparatus is shown in FIG. 8. A particle nozzle 230 directs particles toward a rotating stage 232. As shown in FIG. 8, four substrates 234 are mounted on stage 232. More or fewer substrates can be mounted on a moveable stage with corresponding modifications to the stage and size of the chamber. A motor is used to rotate stage 232.

Movement of stage 232 sweeps the particle stream across a surface of one particular substrate 234 within the path of nozzle 230. Stage 232 can be used to pass sequential substrates through the product stream for one or more coating applications. Stage 232 can include thermal control features that provide for the control of the temperature of the substrates on stage 232. Alternative designs involve the linear movement of a stage or other motions. In other embodiments, the particle stream is unfocused such that an entire substrate or the desired portions thereof is simultaneously coated without moving the substrate relative to the product flow.

If the coating is performed within the reaction chamber, the substrate is mounted to receive product compositions flowing from the reaction zone. The compositions may not be fully solidified into solid particles, although quenching may be fast enough to form solid particles. Whether or not the compositions are solidified into solid particles, the particles can be highly uniform. The distance from the reaction zone to the substrate can be selected to yield desired coating results.

Figure 9:
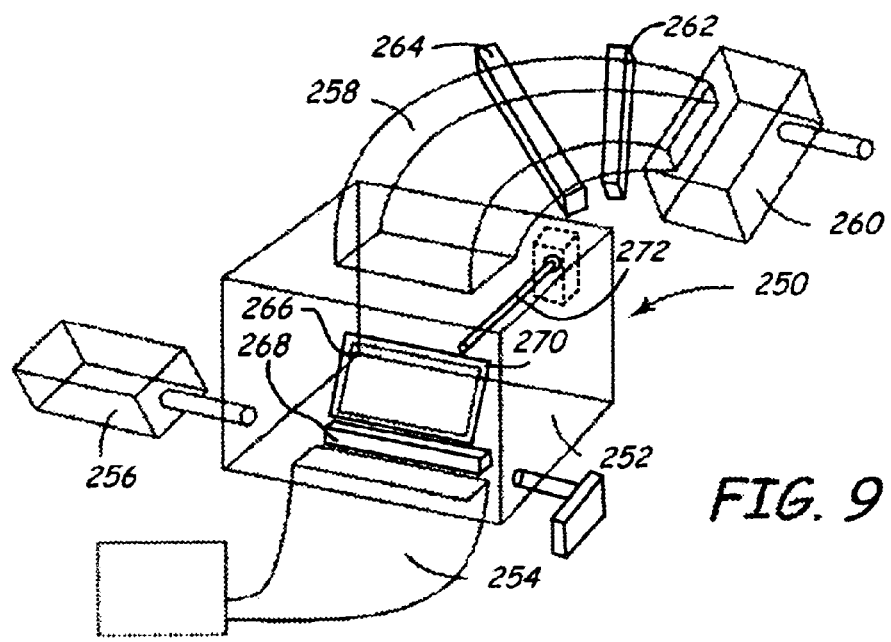
FIG. 9 is a schematic diagram of a light reactive deposition apparatus in which a particle coating is applied to a substrate within the particle production chamber.

An apparatus 250 to perform substrate coating within the reaction chamber is shown schematically in FIG. 9. The reaction/coating chamber 252 is connected to a reactant supply system 254, a radiation source 256 and an exhaust 258. Exhaust 258 can be connected to a pump 260, although the pressure from the reactant stream itself can maintain flow through the system. A valve 262 can be used to control the flow to pump 260. Valve 262 can be used to adjust the pumping rate and the corresponding chamber pressures. A collection system, filter, scrubber or the like 264 can be placed between chamber 252 and pump 260 to remove particles that did not get coated onto the substrate surface.

Substrate 266 can contact flow from a reaction zone 268 to coat the substrate with product particles/powders. Substrate 266 can be mounted on a stage, conveyor, or the like 270 to sweep substrate 266 through the flow. Stage 270 can be connected to an actuator arm 272 or other motorized apparatus to move stage 270 to sweep the substrate through the product stream. Various configurations can be used to sweep the coating across the substrate surface as the product leaves the reaction zone. A shown in FIG. 9, actuator arm 272 translates stage 270 to sweep substrate 266 through the product stream.

Figure 10:
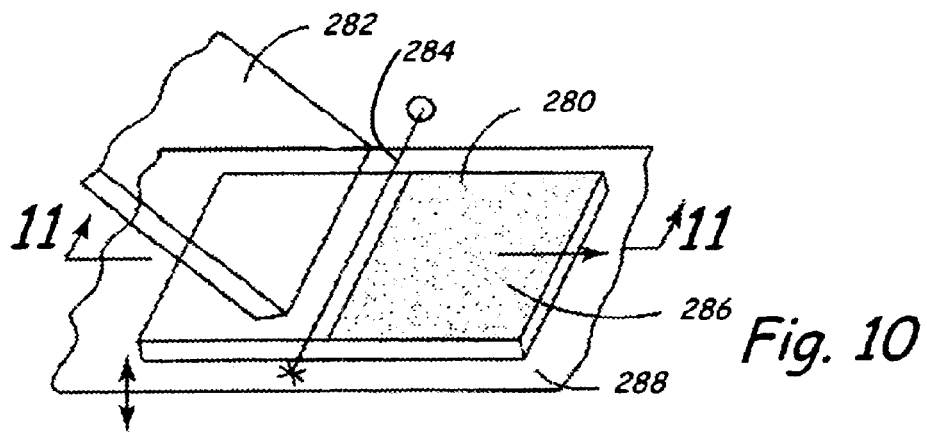
FIG. 10 is a perspective view of a reactant nozzle delivering reactants to a reaction zone positioned near a substrate.
Figure 11:
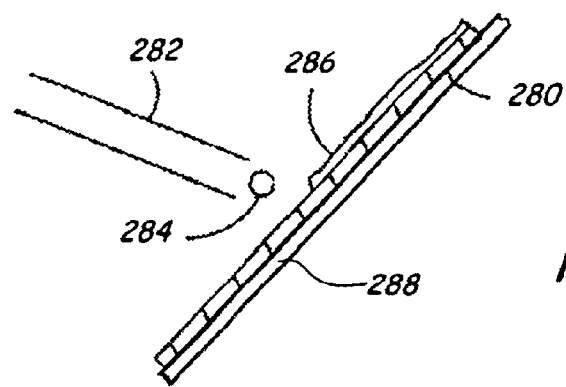
FIG. 11 is a sectional view of the apparatus of FIG. 10 taken along line 11—11.

A similar embodiment is shown in an expanded view in FIGS. 10 and 11. A substrate 280 moves relative to a reactant nozzle 282, as indicated by the right directed arrow. Reactant nozzle 282 is located just above substrate 280. An optical path 284 is defined by suitable optical elements that direct a light beam along path 284. Optical path 284 is located between nozzle 282 and substrate 280 to define a reaction zone just above the surface of substrate 280. The hot particles tend to attract to the cooler substrate surface.

Referring to FIGS. 10 and 11, a particle coating 286 is formed as the substrate is scanned past the reaction zone. In general, substrate 280 can be carried on a conveyor/stage 288. Conveyor/stage 288 can be connected to an actuator arm, as shown in FIG. 9. In alternative embodiments, rollers and a motor, a continuous belt conveyor, or any of a variety of design, including known designs, for translating a substrate can be used to carry the substrate.

In some embodiments, the position of conveyor 288 can be adjusted to alter the distance from substrate 286 to the reaction zone. Changes in the distance from substrate to the reaction zone correspondingly alter the temperature of the particles striking the substrate. The temperature of the particles striking the substrate generally alters the properties of the resulting coating and the requirements for subsequent processing, such as a subsequent heat processing consolidation of the coating. The distance between the substrate and the reaction zone can be adjusted empirically to produce desired coating properties. In addition, the stage/conveyor supporting the substrate can include thermal control features such that the temperature of the substrate can be adjusted to higher or lower temperatures, as desired.

The temperature of the substrate during the deposition process can be adjusted to achieve particular objectives. For example, the substrate can be cooled during the deposition process since a relatively cool substrate can attract the particles to its surface. However, in some embodiments, the substrate is heated, for example to about 500° C., during the deposition process. Particles stick better to a heated substrate. In addition, the particles tend to compact and fuse on a heated substrate such that a subsequent consolidation of the coating into a fused glass or other material is facilitated if the coating were formed initially on a heated substrate.

For the production of discrete devices or structures on a substrate surface formed by the coating formed by the coating process, the deposition process can be designed to only coat a portion of the substrate. Alternatively, various patterning approaches can be used. For example, conventional approaches from integrated circuit manufacturing, such as photolithography and dry etching, can be used to pattern the coating following deposition. Similarly, the deposition process itself can be manipulated to produce structures. For example, masking can be used during the coating process to only coat a selected portion of the substrate, or the mass flow controllers feeding reactants can be adjusted to vary the composition of the coating at selected locations along the substrate. For example, the deposition of stripes of material can be used to construct corresponding devices that can take advantage of the variation in composition.

Before or after patterning, the coating can be heat processed to transform the coating from a layer of discrete particles into a continuous layer of actual material. In some embodiments, particles in the coating are heated to consolidate the particles into a glass or a uniform crystalline layer. Silica glasses are very important for optical applications. Crystalline aluminum oxide and crystalline $SiO_2$, e.g., quartz, may be suitable for optical applications at certain light wavelengths. In addition, crystalline silicon can be used in the formation of silicon-on-insulator electronic components. For example, crystalline silicon can be formed over a release layer. The release layer can function as a transfer layer for the transfer of the crystalline silicon to an insulator surface, such as silicon oxide. The consolidation process can be adapted to leave a powder layer that mechanically decouples the uniform consolidated layer from an underlying substrate.

The formation of coatings by light reactive deposition, silicon glass deposition and optical devices are described further in copending and commonly assigned U.S. patent application Ser. No. 09/715,935 to Bi et al., entitled "COATING FORMATION BY REACTIVE DEPOSITION," incorporated herein by reference.

Deposited Materials

A variety of particles can be produced by laser pyrolysis. Adaptation of laser pyrolysis for the performance of light reactive deposition can be used to produce coatings of comparable compositions as the particles that can be produced by laser pyrolysis. Powders of particular interest include, for example, silicon particles, metal particles, and metal/metalloid compounds, such as, metal/metalloid oxides, metal/metalloid carbides, metal/metalloid nitrides, and metal/metalloid sulfides. For optical materials, some materials of particular interest include, for example, silicon oxide (silica), aluminum oxide, and titanium oxide. Generally, the powders include fine or ultrafine particles with particle sizes in the submicron or nanometer range. The particles may or may not partly fuse or sinter during the deposition.

Light reactive deposition is particularly suitable for the formation of highly uniform particles, especially nanoscale particles. In particular, light reactive deposition can produce a collection of particles of interest generally with an average diameter for the primary particles of less than about 500 nm, alternatively from about 3 nm to about 100 nm, similarly from about 3 nm to about 75 nm, and also from about 3 nm to about 50 nm. Other deposition approaches, such as flame hydrolysis deposition, generally produces micron scale or larger particles. These larger particles are also suitable for the formation of a release layer. In some embodiments, nanoscale particles can be used to form the optical materials while micron scale particles are used to form the release layer since nanoscale particles generally have lower sintering temperatures.

Light reactive deposition, as described above, generally results in primary particles having a very narrow range of particle diameters. With aerosol delivery of reactants for light reactive deposition, the distribution of particle diameters can be particularly sensitive to the reaction conditions. Nevertheless, if the reaction conditions are properly controlled, a very narrow distribution of particle diameters can be obtained with an aerosol delivery system. However, broader distributions of primary particles sizes can also be obtained, if desired, by controlling the flow rates, reactant densities and residence times in light reactive deposition or using other flowing reaction systems.

Furthermore, in embodiments with highly uniform particles, effectively no primary particles have an average diameter greater than about 4 times the average diameter and in other embodiments 3 times the average diameter, and in further embodiments 2 times the average diameter. In other words, the particle size distribution effectively does not have a tail indicative of a small number of particles with significantly larger sizes. An effective cut off in the tail of the size distribution indicates that there are less than about 1 particle in $10^6$ have a diameter greater than a specified cut off value above the average diameter. Narrow size distributions, lack of a tail in the distributions and the roughly spherical morphology can be advantageous for obtaining highly uniform coatings and for highly uniform sintering.

Small particle size and particle uniformity do contribute overall to the uniformity of the resulting coating. In particular, the lack of particles significantly larger than the average, i.e., the lack of a tail in the particle size distribution, leads to a more uniform coating.

In addition, the particles can have a very high purity level. The nanoparticles produced by the above described methods are expected to have a purity greater than the reactants because the reactions and, when applicable, the crystal formation process tends to exclude contaminants from the particle. Some impurities on the surface of the particles may be removed by heating the particles.

Similarly, the coating can be made a uniform thickness, or different portions of the substrate can be coated with different thicknesses of particles. Different coating thicknesses can be applied by varying the sweep speed of the substrate relative to the particle nozzle or by making multiple sweeps of portions of the substrate that receive a thicker particle coating. The particle composition can be similarly varied over different portions of the substrate. This can be accomplished, for example, by changing the reactant stream during the coating process, or by performing multiple partial coating sweeps over different portions of the substrates.

Several different types of nanoscale particles have been produced by laser pyrolysis. Similar particles can be produced by light reactive deposition based on the description above. In particular, many materials suitable for the production of optical materials can be produced by light reactive deposition.

For example, the production of silicon oxide nanoparticles is described in copending and commonly assigned U.S. patent application Ser. No. 09/085,514 to Kumar et al., entitled "Silicon Oxide Particles," incorporated herein by reference. This patent application describes the production of amorphous $SiO_2$. The production of titanium oxide nanoparticles and crystalline silicon dioxide nanoparticles is described in and commonly assigned, U.S. patent application Ser. No. 09/123,255, now U.S. Pat. No. 6,387,531 to Bi et al., entitled "Metal (Silicon) Oxide/Carbon Composites," incorporated herein by reference. In particular, this application describes the production of anatase and rutile $TiO_2$. The production of aluminum oxide nanoparticles is described in copending and commonly assigned, U.S. patent application Ser. No. 09/136,483 to Kumar et al., entitled "Aluminum Oxide Particles," incorporated herein by reference.

The synthesis by laser pyrolysis of silicon carbide and silicon nitride is described in copending and commonly assigned U.S. patent application Ser. No. 09/433,202 to Reitz et al., entitled "Particle Dispersions," incorporated herein by reference. For the production of silicon nitride, ammonia ($NH_3$) was the nitrogen source. For the production of silicon carbide particles, diethoxysilane was decomposed to form the particles. The production of iron sulfide ($Fe_{1-x}S$) nanoparticles by laser pyrolysis is described in Bi et al., Material Research Society Symposium Proceedings, vol 286, p. 161–166 (1993), incorporated herein by reference. Precursors for laser pyrolysis production of iron sulfide were iron pentacarbonyl (Fe(CO)$_5$) and hydrogen sulfide (H$_2$S).

Doped compositions, especially doped silicon oxides can be produced by introducing appropriate precursors. For example, a convenient approach to the production of an optical layer with a higher index of refraction is to use a doped silicon oxide. Suitable dopants include, for example, titanium oxide, tantalum oxide, tin oxide, niobium oxide, zirconium oxide, aluminum oxide, lanthanum oxide, germanium oxide, boron oxide or combinations thereof.

Some silicon oxide dopants also significantly lower the flow temperature of the material. In particular, boron and phosphorous dopants can help to lower the viscosity and therefore the flow temperature of silicon oxide. Boron dopants also lower the index-of-refraction while phosphorous dopants raise the index-of-refraction.

Suitable dopants for silicon oxide materials include, for example, boron, germanium, phosphorous, titanium, zinc and aluminum. Suitable boron precursors include, for example, boron trichloride (BCl$_3$), diborane (B$_2$H$_6$), and BH$_3$. Suitable phosphorous precursors include, for example, phosphine (PH$_3$), phosphorus trichloride (PCl$_3$), phosphorus oxychloride (POCl$_3$) and P(OCH$_3$)$_3$. Suitable germanium precursors include, for example, GeCl$_4$. Suitable titanium precursors include, for example, titanium tetrachloride (TiCl$_4$), and titanium isopropoxide (Ti[OCH(CH$_3$)$_2$]$_4$). Suitable liquid zinc precursor compounds include, for example, diethyl zinc (Zn(C$_2$H$_5$)$_2$) and dimethyl zinc (Zn(CH$_3$)$_2$). Suitable solid, zinc precursors with sufficient vapor pressure of gaseous delivery include, for example, zinc chloride (ZnCl$_2$). Suitable liquid, aluminum precursors include, for example, aluminum s-butoxide (Al(OC$_4$H$_9$)$_3$). A number of suitable solid, aluminum precursor compounds are available including, for example, aluminum chloride (AlCl$_3$), aluminum ethoxide (Al(OC$_2$H$_5$)$_3$), and aluminum isopropoxide (Al[OCH(CH$_3$)$_2$]$_3$).

Using aerosol delivery apparatuses, solid precursor compounds can be delivered by dissolving the compounds in a solvent. Alternatively, powdered precursor compounds can be dispersed in a liquid/dispersant for aerosol delivery. Liquid precursor compounds can be delivered as an aerosol from a neat liquid, a multiple liquid dispersion or a liquid solution. Aerosol reactants can be used to obtain a significant reactant throughput. A solvent/dispersant can be selected to achieve desired properties of the resulting solution/ dispersion. Suitable solvents/dispersants include water, methanol, ethanol, isopropyl alcohol, other organic solvents and mixtures thereof. The solvent should have a desired level of purity such that the resulting particles have a desired purity level. Some solvents, such as isopropyl alcohol, are significant absorbers of infrared light from a CO$_2$ laser such that no additional laser absorbing compound may be needed within the reactant stream if a CO$_2$ laser is used as a light source.

If aerosol precursors are used, the liquid solvent/ dispersant can be rapidly evaporated by the light beam in the reaction chamber such that a gas phase reaction can take place. Thus, the fundamental features of the laser pyrolysis reaction are unchanged by the presence of an aerosol. Nevertheless, the reaction conditions are affected by the presence of the aerosol.

A number of suitable solid, metal precursor compounds can be delivered as an aerosol from solution. Suitable silicon precursors for aerosol production include, for example, silicon tetrachloride Si(Cl$_4$), which is soluble in ether, and trichlorosilane (Cl$_3$HSi), which is soluble in carbon tetrachloride. Suitable dopants can be delivered in an aerosol. For example, zinc chloride (ZnCl$_2$) and zinc nitrate (Zn(NO$_3$)$_2$) are soluble in water and some organic solvents, such as isopropyl alcohol. Similarly, a boron dopant can be delivered as an aerosol using ammonium borate ((NH$_4$)$_2$B$_4$O$_7$), which is soluble in water and various organic solvents.

The precursor compounds for aerosol delivery are dissolved in a solution generally with a concentration greater than about 0.1 molar. Generally, the greater the concentration of precursor in the solution the greater the throughput of reactant through the reaction chamber. As the concentration increases, however, the solution can become more viscous such that the aerosol may have droplets with larger sizes than desired. Thus, selection of solution concentration can involve a balance of factors in the selection of a desired solution concentration.

Particle Coatings

The basic process for the deposition of particle coatings has been described in detail above. To obtain particular objectives, the features of the coating can be varied with respect to both number and composition of layers of the powders and location of materials on the substrate. In addition, multiple layers of particles can be deposited in a controlled fashion to form layers in the final material. To form mechanical decoupling layers with release layers, a layer with higher flow/melt temperatures can be deposited below materials with lower flow/melt temperatures.

The structures in some embodiments have a release layer, e.g., a powder layer or a partially sintered powder layer, and an overlayer of uniform material, such as a uniform optical material. Generally, to form a device the uniform material is localized to a particular location on the substrate. Localization of a uniform material can involve selected deposition of the material at a particular location or etching following deposition. The procedures described above can be adapted to apply the coating to desired sections, for example by sweeping the substrate relative to the particle nozzle such that only the desired portion of the substrate is swept past the nozzle. Etching is described further below.

Thus, layers of materials, as described herein, may include particular layers that do not have the same planar extent as other layers. Thus, some layers may cover the entire substrate surface or a large fraction thereof while other layers cover a smaller fraction of the substrate surface. In this way, the layers can form one or more localized devices. At any particular point along the planar substrate, a sectional view through the structures may reveal a different number of identifiable layers than at other point along the surface. Substrateless planar devices are also contemplated. For these embodiments, a projection of the planar device to obtain a maximum area provides a planar extent of the device. This projected planar extent is analogous to the substrate surface for orienting a position along the planar surface.

Regardless of whether or not a substrate is present, the planar optical structures have a planar aspect that is distinctly different from elongated optical fibers and the like. The planar aspect of the planar optical structures can be evaluated based on a planar projection of the structure having the largest projected surface area. This planar projection can be evaluated without complications due to surface features or the like. Generally, the planar structure has a maximum area planar projection with a surface area of at least about 1 cm$^2$, in other embodiments at least about 10 cm$^2$ in further embodiments at least about 25 cm$^2$, and in additional embodiments at least about 50 cm$^2$. A five inch diameter wafer substrate would result in a structure having a maximum projected area of 6.25 $\pi$inches$^2$.

In addition, the planar optical structures generally have an aspect ratio no more than about 20, in other embodiments no more than about 10 and in other embodiments, no more than about 5. The aspect ratio is the ratio of the length to width, where the length is the distance along the longest segment in the planar projection connecting two edge points and the width is the distance along the longest segment perpendicular to the length segment connecting two edge points. The planar nature of the structure can also be expressed in terms of the minimum edge-to-edge distance in the maximum area projection for segments passing through the center of the projected area. Generally, the minimum edge-to-edge distance is at least about 1 cm, in many embodiments at least about 2 cm and in other embodiments at least about 5 cm. Rectangular structures are convenient with respect to placement of optical structures along the planar surface. Circular structures are convenient because of the availability of circular shaped substrates.

Regardless of approaches to place a uniform material at a particular location on a substrate, the release layer may or may not be similarly limited to particular locations on a substrate. For example, a single release layer can be located below a plurality of different uniform materials. For example, the powder layer can mechanically decouple a set, or a portion thereof, of integrated optical devices from a lower lying substrate. Alternatively, if the powder materials are selectively deposited, etched or otherwise localized on the substrate surface, a plurality of release layers can be deposited to function at selective portions of the substrate. In other embodiments, only some of the optical devices are mechanically decoupled from the substrate by a release layer.

The release layer generally includes powders with significantly higher flow temperatures than the materials deposited above. The composition of the powder can change gradually from one composition to another by adjusting the precursor composition in the deposition apparatus. The initial composition is selected with an appropriately high sintering temperature and the final composition is selected to have an appropriately low sintering temperature. Even if the compositions are applied in equal amounts, some segregation evidently takes place in the coatings such that the composition is not uniform through the material. Conditions and compositions can be selected to produce a desirable segregation such that a release layer is formed upon heat treatment. In other embodiments, the composition of the powder changes abruptly to form the transition between the powder that consolidates into the uniform material and the powder that forms the release layer.

Alternatively, the release layer can be formed by a thermal exposure from the top to consolidate only a portion of the thickness of material, leaving the release layer intact. Thus, a multiple layer structure is formed. The optical material is consolidated by heating to form a uniform optical material, either amorphous glass or crystalline. Due to the higher flow temperature of the underlayer, the formation of the uniform optical material can be performed without sintering the decoupling layer into a uniform material that would then couple the adjacent layers mechanically.

Consolidation of Materials

Heat treatment can melt and fuse the particles and lead to compaction, i.e., densification, of the powders to form the desired material, especially optical material. This fusing of the particles is generally referred to as consolidation. To consolidate the uniform materials, the materials can be heated to a temperature above the melting point or the flow temperature of the material to consolidate the coating into a smooth uniform material. If the temperature is not raised above a certain critical value, the material does not flow significantly although the powders do convert to a homogenous/uniform material.

Generally, the heating is performed under conditions to melt the particles into a viscous liquid. Because of the high viscosity, the material does not flow significantly on the substrate surface. Processing at higher temperatures to reduce the viscosity of the melt can result in undesirable melting of the substrate, migration of compositions between layers or in flow from a selected area of the substrate. The heating and quenching times can be adjusted to change the properties of the consolidated coatings. In addition, heat treatment can remove undesirable impurities and/or change the stoichiometry and crystal structure of the material.

Suitable processing temperatures and time generally depend on the composition of the particles. Small particles on the nanometer scale generally can be processed at lower temperatures and/or for shorter times relative to powders with larger particles due to lower melting points for the nanoparticles in comparison with bulk material. However, it may be desirable to use a comparable melting temperature to obtain greater surface smoothness that results from improved melting of the nanoparticles. For the processing of silicon oxide nanoparticles, the particle coatings can be heated to a temperature on the order of 1200° C. Dopants in the silicon oxide particles can lower the appropriate consolidation temperatures.

Heat treatments can be performed in a suitable oven. It may be desirable to control the atmosphere in the oven with respect to pressure and/or the composition of the gases. Suitable ovens include, for example, an induction furnace or a tube furnace with gas flowing through the tube. The heat treatment can be performed following removal of the coated substrates from the coating chamber. In alternative embodiments, the heat treatment is integrated into the coating process such that the processing steps can be performed sequentially in the apparatus in an automated fashion.

For many applications, it is desirable to apply multiple particle coatings with different compositions. Each coating can be applied to a desired thickness. For example, in some embodiments, silicon oxide and doped silicon oxide can be deposited in alternating layers. Specifically, two layers with different compositions can be deposited with one on top of the other, such as layer A and layer B formed as AB. In other embodiments, more than two layers each with different compositions can be deposited, such as layer A, layer B and layer C deposited as three sequential layers ABC. Similarly, alternating sequences of layers with different compositions can be formed, such as ABABAB . . . or ABCABCABC . . .

After the consolidation process is performed to density the uniform layers, the release layer generally has an average thickness from about 0.25 microns to about 30 microns, in further embodiments from about 0.5 microns to about 15 microns, and in other embodiments from about 0.5 microns to about 10 microns. The total average thickness of the uniform layers, e.g., optical layers, is generally no more than about 1 millimeters, in many embodiments no more than about 250 microns, in other embodiments no more than about 150 microns, and in still other embodiments no more than about 100 microns. Individual uniform layers generally have an average thickness of less than 100 microns, in many embodiments from about 1 micron to about 50 microns, in other embodiments from about 3 microns to about 20 microns. A person of skill in the art will recognize that ranges within these specific ranges are contemplated and are within the scope of the present disclosure. Thicknesses are measured perpendicular to the projection plane in which the structure has a maximum surface area.

The material with multiple particle coatings can be heat treated after the deposition of each layer or following the deposition of multiple layers or some combination of the two. The optimal processing order generally would depend on the melting point of the materials. Generally, however, it is desirable to heat treat and consolidate the composite layers simultaneously. If the heating temperatures are picked at reasonable values, the melted materials remain sufficiently viscous that the layers do not merge undesirable amounts at the interface. Slight merging of the layers generally does not effect performance unacceptable amounts, especially if the layers are slightly thicker than minimum requirements.

As noted above, the particles that form the release layer have a higher melting/flow temperature than the overlaying optical materials. The higher melting/flow temperatures can be due to a different composition, a different doping or a different particle size. The use of nanoparticles can significantly lower the melting point without the need for the use of additives to lower the melting temperature. Thus, for example, the underlying particles can be larger than the over layer such that the underlayer forms a release layer while the over layer becomes a uniform optical material. Alternatively, the underlayer can be, for example, titanium oxide ($TiO_2$) powders while the optical materials are formed from lower melting silicon oxide ($SiO_2$) glass.

In other embodiments, the powders in the release layer are silicon oxide ($SiO_2$) particles or dopes silicon oxide particles with optical materials formed from consolidated doped silicon oxides, possibly with different dopings than the release layer. Some dopants affect the flow temperature as well as the optical properties. Thus, the dopant can be selected to flow into a uniform optical material at a lower temperature and produce a desired value of the index of refraction. Suitable dopants to lower the flow temperature when placed into silicon oxide ($SiO_2$) include, for example, boron, phosphorous, germanium, and combinations thereof. The amount of dopant is selected to yield a desired flow temperature and index-of-refraction.

A particle coating can be held together by relatively weak forces, generally van der Waals forces. The release layer includes materials that are not fully densified. The amount of sintering of the powders in the release layer can adjust the mechanical stability of the layer. Too much sintering may begin to partly mechanically couple adjacent layers. The processing of the release layer generally is selected based on the intended use. For layer transfers of optical materials described further below, essentially no sintering may be desired such that the optical material transfers easily. In embodiments in which an integrated optical circuit is formed, a moderate amount of sintering may be desired to mechanically stabilize the material. The release layers can have a range of morphologies from essentially no observable sintering to observable fusing of the particles, although the release layers have visible voids, and possibly particle boundaries, in micrographs. The release layers are clearly distinguishable from uniform optical material due to the presence of visible voids distributed throughout the release layer indicating that the material is not fully densified.

Etching and Device Formation

While the coatings described herein can have a variety of applications, optical devices formed on a substrate surface are of particular interest. The control of light propagation along the optical devices requires variation in the index-of-refraction in adjacent materials. A device can be distinguished by boundaries of a material with an index-of-refraction or structure that is different from adjacent materials. A basic feature of the optical devices is that they are produced from a crystalline or amorphous material that is transparent to the electromagnetic radiation to be transmitted through the device.

Devices of interest include, for example, optical waveguide devices, such as optical couplers, splitters, arrayed waveguide grating (AWG) and the like. Waveguides manufactured on a substrate surface are referred to as planar waveguides. Planar waveguides are useful in the production of integrated optical circuits for optical communication and other opto-electronics applications.

Light propagates through a material having a higher refractive index than the surroundings. In some suitable embodiments, the planar waveguides have a thickness roughly on the order of the wavelength of the light, i.e., electromagnetic radiation, to be transmitted along the waveguide. For example, for 1.5 micron light, a thickness or about 6 microns would be reasonable for the waveguide. In some embodiments, waveguides do not significantly attenuate the light transmitted through the material.

To produce a planar optical waveguide by particle coating technology, generally three layers are deposited. A core layer forms a light channel surrounded by an under-cladding layer, and a over-cladding layer. The under-cladding layer generally is applied between the substrate and the core layer since the substrate generally does not have appropriate optical properties. In other words, the core layer may be formed directly onto the substrate surface, however, one or more strata generally are deposited between the core layer and the substrate.

Figure 12:
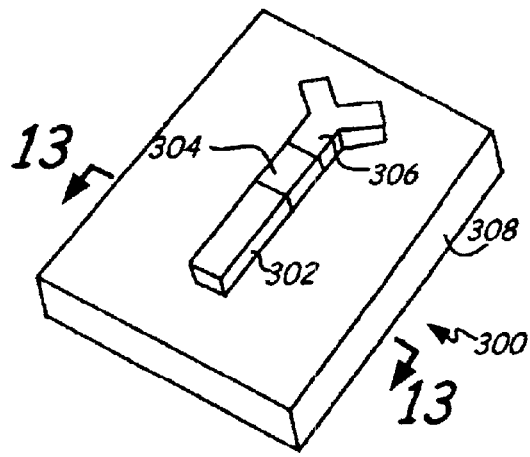
FIG. 12 is a schematic perspective view of an integrated optical circuit with a release layer between an optical layer and the substrate.
Figure 13:
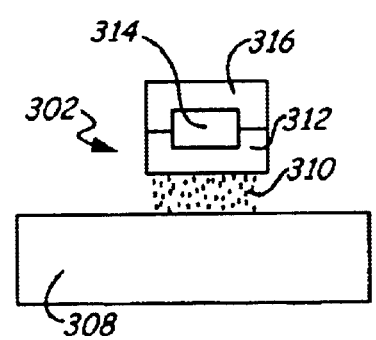
FIG. 13 is a sectional view of the integrated optical circuit of FIG. 12 taken along line 13—13.

In the present materials, a release layer generally is located between the undercladding layer and the substrate. The release layer is used to mechanically decouple the substrate from the optical materials. An optical device mechanically decoupled from the substrate is shown schematically in FIGS. 12 and 13. As shown in FIG. 12, optical circuit 300 includes optical devices 302, 304, 306 on substrate 308. A section view including optical device 302 is shown in FIG. 13. Optical device 302 includes a release layer 310, an undercladding optical material 312, a core optical material 314 and an overcladding optical material 316.

Figure 14:
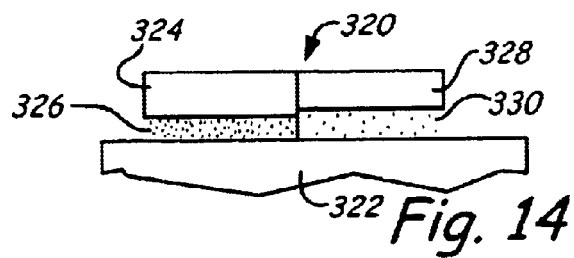
FIG. 14 is a side view of an alternative embodiment of an integrated optical circuit.

Referring to an alternative embodiment in FIG. 14, integrated optical circuit 320 has a substrate 322, a first uniform optical material 324, first release layer 326, a second uniform optical material 328, and second release layer 330. First release layer 326 may or may not be compositionally different from second release layer 330. First uniform optical material 324 can be different from second uniform optical material 330 in any optical property, such as index-of-refraction, which may be the result of, for example, a compositional difference, a density difference, or a crystal structure difference.

In one embodiment, the substrate is formed from silicon. Common substrates are round wafers, although square or other shapes can be used. A release layer is formed from un-doped silicon dioxide. An under-cladding layer of doped silicon dioxide is deposited over the substrate. A core layer of doped silicon dioxide powder is then deposited over the cladding layer. The undercladding layer generally is consolidated prior to the addition of an additional layer, although both layers can be consolidated simultaneously if the heat treatment is performed under suitable conditions. A convenient approach to the production of a core layer with a higher index of refraction is to use a doped silicon oxide. Suitable dopants include, for example, titanium oxide, tantalum oxide, tin oxide, niobium oxide, zirconium oxide, aluminum oxide, lanthanum oxide, germanium oxide, boron oxide or combinations thereof. Generally, the under cladding layer and the overcladding layer can be produced with doped silicon dioxide with a lower index of refraction than the doped core layer.

As the index-of-refraction of the core material is increased, the desired thickness of the layer decreases because of changes in the wavelength with index-of-refraction. Thus, the correlation between these parameters should be controlled accordingly. The use of excessive amounts of dopants should be avoid since excessive dopants can result in the loss of transparency of the material with respect to the light. The upper limit on the amount of dopant depends on the dopant, although for all materials there would generally be less than about 40% by weight dopant.

The core layer can be deposited over selected portions of the substrate to form specific structures. Alternatively, after consolidation of the core layer, the material can be contoured to produce desired devices. The contouring can be performed by patterning with photolithography combined with etching and/or with other techniques used in the formation of electronic integrated circuits. After the formation of the desired structures from the core material, an over-cladding layer generally is applied. The over-cladding layer also has a lower index of refraction than the core layer. The formation of planar waveguides by flame hydrolysis deposition is described further in U.S. Pat. No. 3,934,061 to Keck et al., entitled "Method of Forming Planar Optical Waveguides," incorporated herein by reference. The formation of coupling elements with etching is described further in U.S. Pat. No. 4,735,677 to Kawachi et al., entitled "Method For Fabricating Hybrid Optical Integrated Circuit," incorporated herein by reference.

Figure 15:
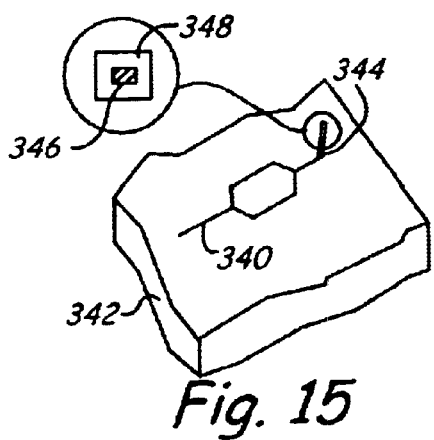
FIG. 15 is a top perspective view of an optical waveguide bent out from the plane of a substrate surface with the waveguide connecting to a planar optical device.

Below, layer transfer is discussed in detail. However, a uniform material can be etched to produce a thin structure that can be bent out from the plane of the substrate. The release layer is separated under the thin structure. Separation forces are applied as described below. Because of the thin structure, the structure can be bent without fracturing the connection with a remaining portion of the structure on the substrate surface. An example of an embodiment with an extension out of the plane is shown in FIG. 15. Device 340 is located on substrate 342. Bent extension 344 is bended out from the plane of the surface of substrate 342. For optical devices, bent extension 344 can have, for example, the form of a waveguide with a core 346 within cladding 348, as shown in the insert of FIG. 15. Core 346 generally has a higher index-of-refraction than cladding 348. Bent extension 344 can be inserted into a socket to connect device 340 with other devices not located on the plane of substrate 342.

Layer Transfer

The structures with a release layer under a uniform/consolidated layer can be used for the transfer of the uniform layer, such as an optical layer, to another material. To perform the transfer, the uniform material is placed in physical contact with the receiving surface. The release layer is mechanically separated to release the uniform layer and effectuate the transfer to the receiving layer. The receiving layer with the transferred uniform layer can be further processed following the transfer.

The receiving surface can be an optical material or a substrate, such as silicon, glass or a metal, such as aluminum. Also, no receiving surface can be used such that the separated uniform materials become a free space structure, such as a planar optical structure, i.e., a substrateless planar optical device, which can include a plurality or integrated optical devices. When the receiving surface is not an optical material, an adhesive can be placed on the receiving surface to facilitate the transfer. For these embodiments, it may be desirable that the release layer is less sintered and possibly having no appreciable sintering. Then, the separation force to separate the release layer can be reduced relative to other forms.

The separation force can be applied by supplying mechanical energy. Mechanical energy can be supplied as ultrasonic vibrations or mechanical vibrations. Alternatively, the layers can be directly separated. In addition, heat and/or pressure can be applied to supply the separation energy. Similarly, cold can supply the separation energy in which the different coefficients of expansion result in separation upon rapid cooling. Rapid cooling can be accomplished, for example, by placing the structure in liquid nitrogen.

In alternative embodiments, light energy is used to supply the separation energy. Silicon oxide of the wafer can be in a glass form that is transparent or mostly transparent to selected light wavelengths. The release layer will have an altered absorption profile relative to the silicon oxide due to the particle surface and compositional differences. Thus, a suitable light wavelength can be directed through the silicon oxide to be selectively and primarily absorbed by the powder layer. Generally, visible light is suitable, and the light can be supplied by a laser or other intense light source. The light can be scanned across the wafer surface, or the light can be shined across the entire wafer surface at once. Selective absorption at the powder layer can selectively cleave the powder layer without heating the entire wafer. Thus, the process is not a thermal process.

To complete the transfer of the optical layer to the substrate surface, the substrate must be contacted with attractive forces to the wafer surface. Sufficient attractive forces can be applied through, for example, self-bonding, adhesive bonding, electro-static bonding or anodic bonding. Self-bonding can be achieved by chemically activating one or both surfaces. Suitable adhesives include, for example, epoxies, polyimides, siloxanes and silicates, which can be dispersed with solvents. Adhesives can be heat cured, if appropriate. Electro-static bonding involves the use of surface charge to attract the two surfaces. Anodic bonding involves the application of strong electric fields and heat to bond two layers in contact and is effective to bond glasses together.

Following the transfer of the optical layer to the receiving substrate, additional processing can be performed. For example, the substrate with the transferred optical layer can be heat treated to improve the optical qualities of the material. Also, the transferred optical layer can be polished, for example, with chemical-mechanical polishing or flame polishing, to smooth the transferred layer and remove any residual powders. The optical layer can be etched to form patterns of the optical material. In particular, to form patterned structures, patterning approaches, such as photolithography, along with etching, such as chemical etching or radiation-based etching, can be used to form desired patterns in one or more layers. Additional layers can be transferred or deposited onto the transferred optical layer before or after additional processing, as described above.

EXAMPLE

This example describes the coating of a silicon substrate with a doped silicon oxide glass using light reactive deposition along with the production of a release layer between the optical glass layer and the silicon substrate.

Figure 16:
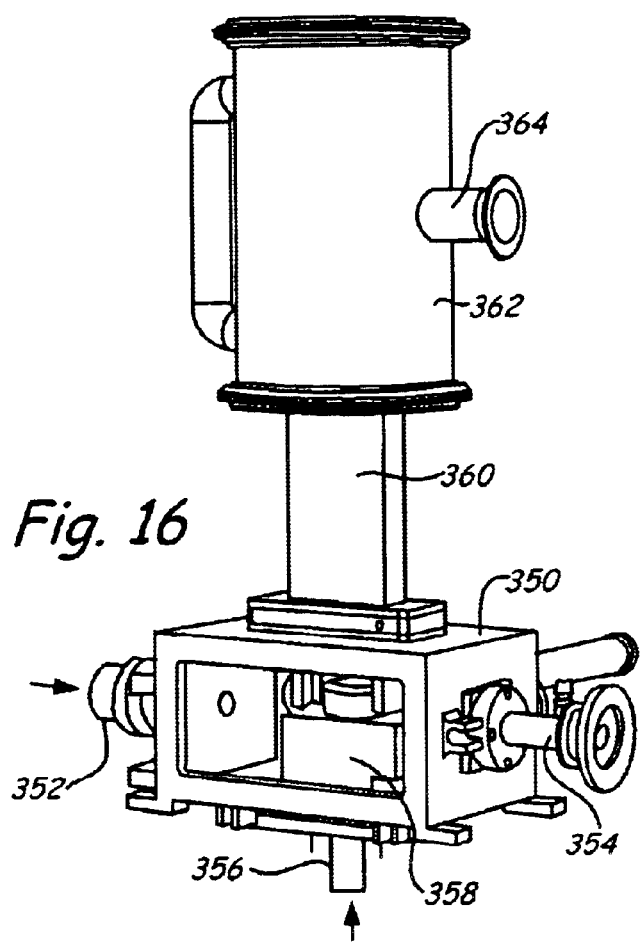
FIG. 16 is a perspective view of a light reactive deposition chamber.
Figure 17:
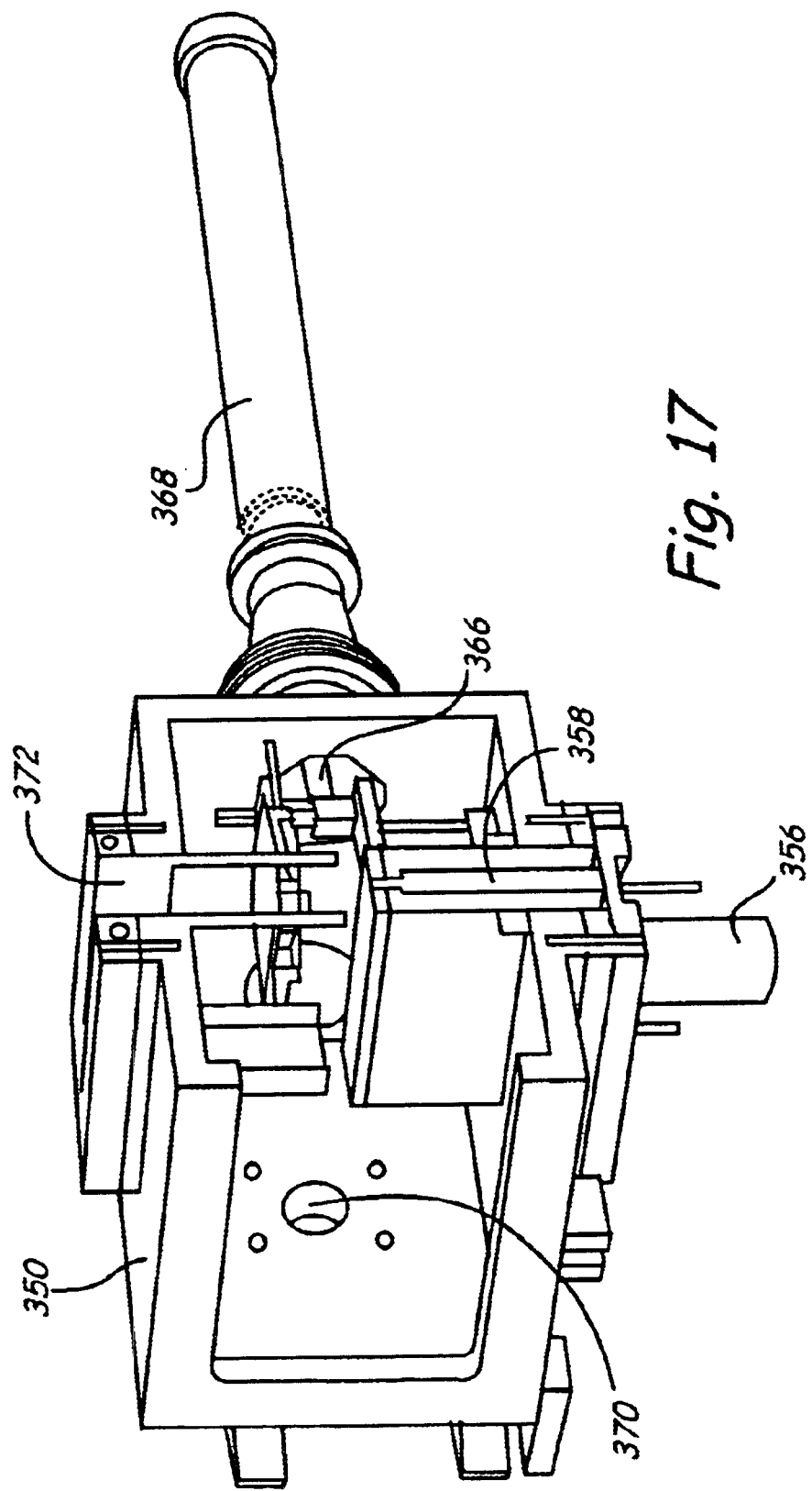
FIG. 17 is an expanded view of the reaction chamber of the light reactive deposition chamber of FIG. 16.
Figure 18:
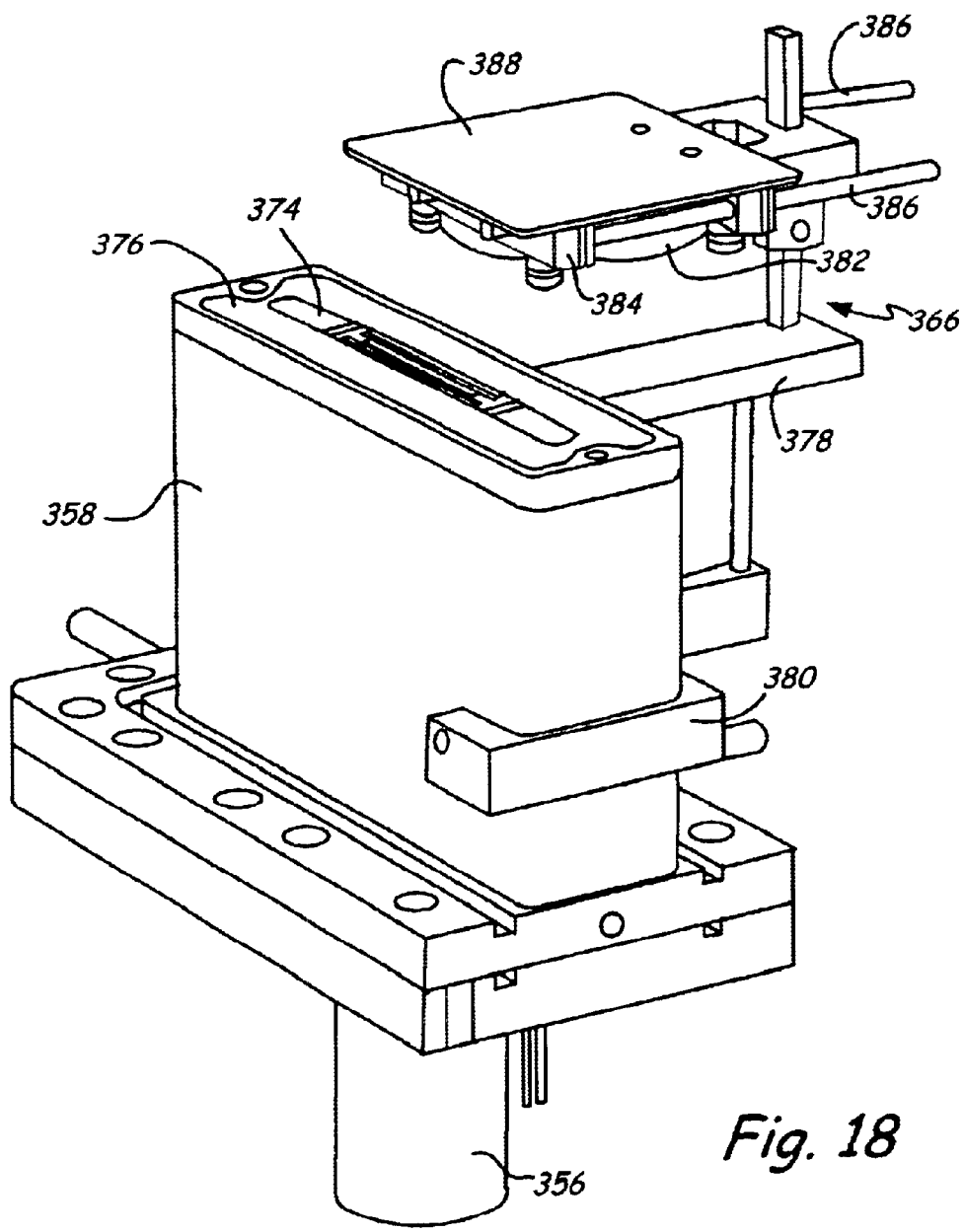
FIG. 18 is an expanded view of the substrate support of the reaction chamber of FIG. 17.

Particle coating was performed using light reactive deposition in which wafer coating was performed within the reaction chamber by sweeping the substrate through a product particle stream. The apparatus used to coat a substrate/wafer moved through the reaction stream is shown in FIGS. 16–18. Referring to FIG. 16, process chamber 350 includes a light tube 352 connected to a $CO_2$ laser and a light tube 354 connected to a beam dump. An inlet tube 356 connects with a precursor delivery system that delivers vapor reactants and carrier gases. Inlet tube 356 leads to process nozzle 358. A particle transport tube 360 connects to process chamber 350 along the flow direction from process nozzle 358. Particle transport tube 360 leads to a particle filtration chamber 362. Particle filtration chamber 362 connects to a pump at pump connector 364.

An expanded view of process chamber 350 is shown in FIG. 17. A wafer carrier 366 supports a wafer above process nozzle 358. Wafer carrier 366 is connected with an arm 368, which translates the wafer carrier to move the wafer through the particle stream emanating from the reaction zone where the laser beam intersects the precursor stream from process nozzle 358. Arm 368 includes a linear translator that is shielded with a tube. A laser entry port 370 is used to direct a laser beam between process nozzle 358 and the wafer. Unobstructed flow from process nozzle would proceed directly to exhaust nozzle 372, which leads to particle transport tube 360.

An expanded view of wafer carrier 366 and process nozzle 358 is shown in FIG. 18. The end of process nozzle 358 has an opening for precursor delivery 374 and a shielding gas opening 376 around precursor opening to confine the spread of precursor and product particles. Wafer carrier 366 includes a support 378 that connects to process nozzle 358 with a bracket 380. A circular wafer 382 is held in a mount 384 such that wafer 382 slides within mount 384 along tracks 386 to move wafer 382 into the flow from the reaction zone. Backside shield 388 prevents uncontrolled deposition of particles on the back of wafer 382. Tracks 386 connect to arm 368.

Doped $SiO_2$ was coated onto a silicon wafer by light reactive deposition. The reaction was carried out in a chamber comparable to the chamber shown in FIGS. 16–18 with a precursor delivery system similar the system shown schematically in FIG. 2. Silicon tetrachloride (Strem Chemical, Inc., Newburyport, Mass.) precursor vapor was carried into the reaction chamber by bubbling $N_2$ carrier gas through $SiCl_4$ liquid in a container at room temperature. Dopants for the ultimate silica glass were also introduced by bubbling $N_2$ carrier gas through liquid precursors. Dopant precursors were $POCl_3$ and $BCl_3$. Argon gas was mixed with the reactant stream as a diluent/inert gas to moderate the reaction. $C_2H_4$ gas was used as a laser absorbing gas. $O_2$ was used as an oxygen source and was mixed with the reactants. The reactant gas mixture containing $SiCl_4$, argon, nitrogen, dopant precursor ($POCl_3$ and $BCl_3$) and $C_2H_4$ was introduced into the reactant gas nozzle for injection into the process chamber.

During a run, the wafer was moved through the product stream twice. A majority of the powder produced was deposited on the wafer with a portion collected in the pumping system. The reaction precursors for the production of boron and phosphorous-doped silicon dioxide glass were $SiCl_4$, $POCl_3$ and $BCl_3$ with ethylene as an infrared absorbing gas and $O_2$ as an oxygen source. Following completion of the coating run, the wafers appeared to have a powdery white coating that appeared uniform across the surface of the wafer. The coating had a thickness of roughly 100 microns, as measured by scanning electron microscopy (SEM), with an apparent density of about 10%.

Figure 19:
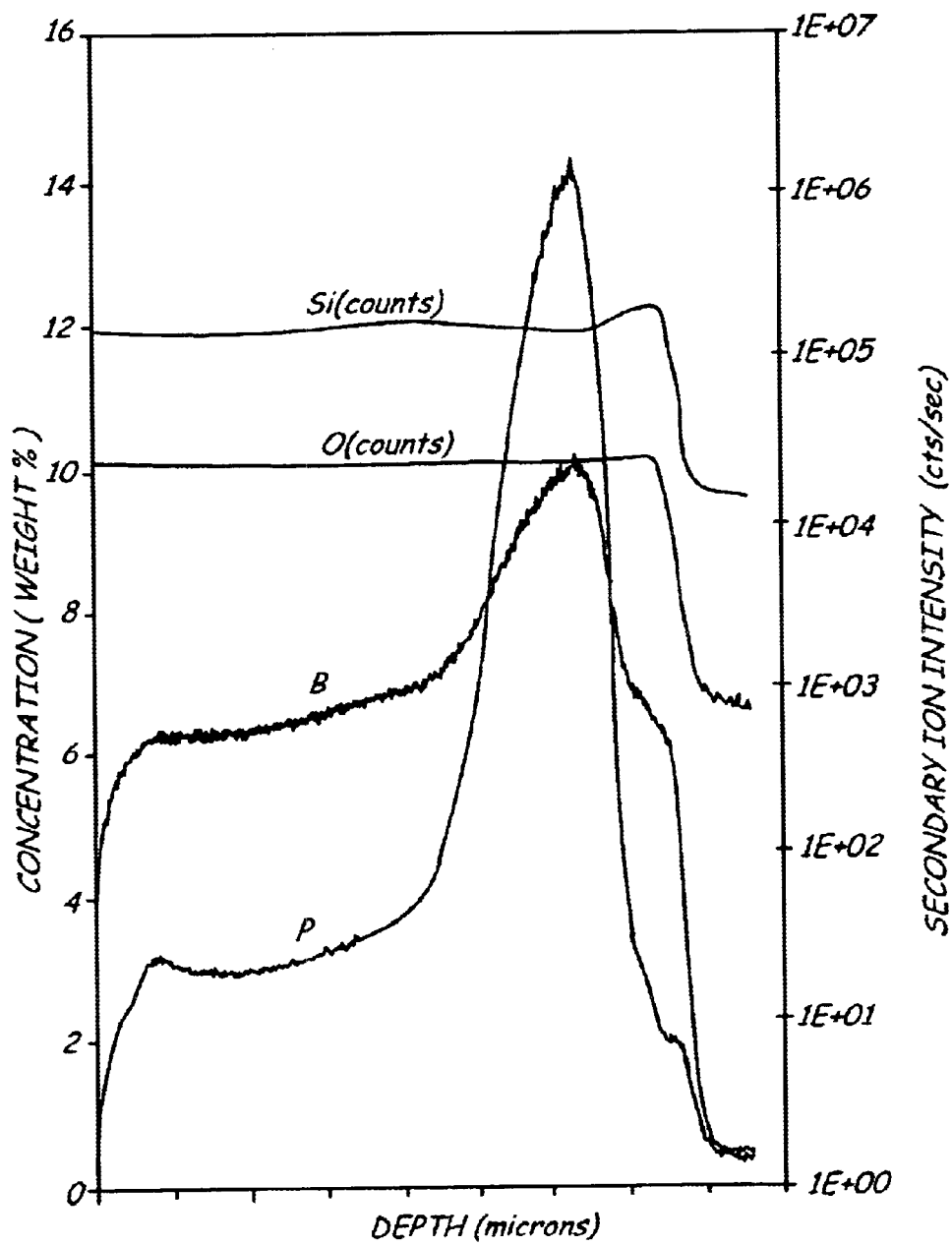
FIG. 19 is a plot of secondary ion mass spectrometry measurements scaled to provide concentrations of Si, O, B and P within a glass.

The variation in dopant composition was verified with secondary ion mass spectrometry (SIMS). SIMS uses a beam of sputtered ballistic particles that collide with the surface to be analyzed. The resulting ion stream is analyzed in a quadripole mass spectrometer. Depth is obtained by assuming a constant erosion rate and from a measurement of the final pit depth, for example, by atomic force microscopy or a profilometer. Concentrations of elements are obtained by comparing measurements with measurements made at the same sputtering rate with a similar standard material with known concentrations. The SIMS measurements were obtained with a PHI™ 6600 SIMS System (PHI Instruments, Eden Prairie, Minn.). The sputter rate from an implant standard was used to obtain the sputter depth. The SIMS plot is shown in FIG. 19. It can be seen that the concentration of boron and phosphorous dopants is not uniform through the glass.

Figure 20:
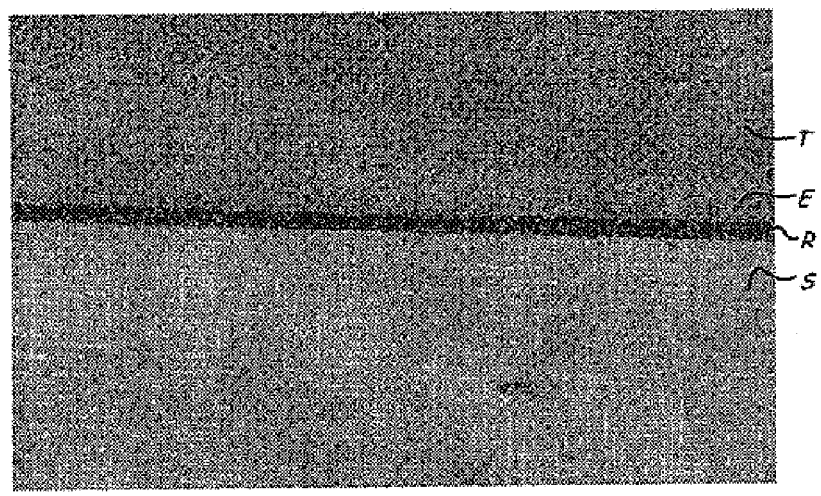
FIG. 20 is a scanning electron micrograph of a silica glass on a silicon substrate with a release layer between the glass and the silicon substrate.

The coated wafers were heated in an oven at 900° C. for 2 hours. The temperature was ramped to the peak temperature at a rate of 50 degrees per minute. After being removed from the oven, the wafers had a clear glass on their surface. Sections cut from the consolidated wafers from the oven were examined using scanning electron microscopy (SEM). The micrograph is shown in FIG. 20 with the top surface of the glass labeled T, the edge of the glass labeled E, the release layer labeled R and the silicone substrate labeled S. A release layer is visible in FIG. 20 between the silicon substrate and a silicon oxide glass. The powder layer is about 3 microns in thickness, and the glass layer is about 7 microns thick.

Figure 21:
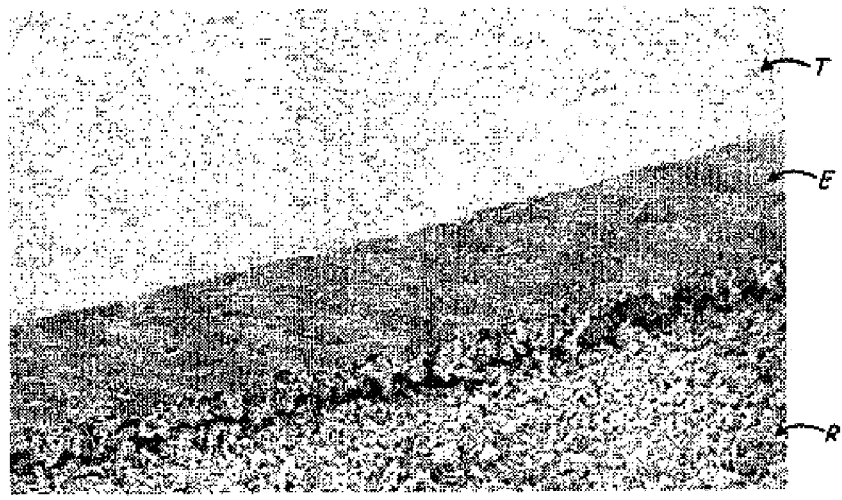
FIG. 21 is an SEM micrograph showing an edge of a glass layer on a substrate adjacent a position where a glass layer was removed with a portion of the release layer left behind.
Figure 22:
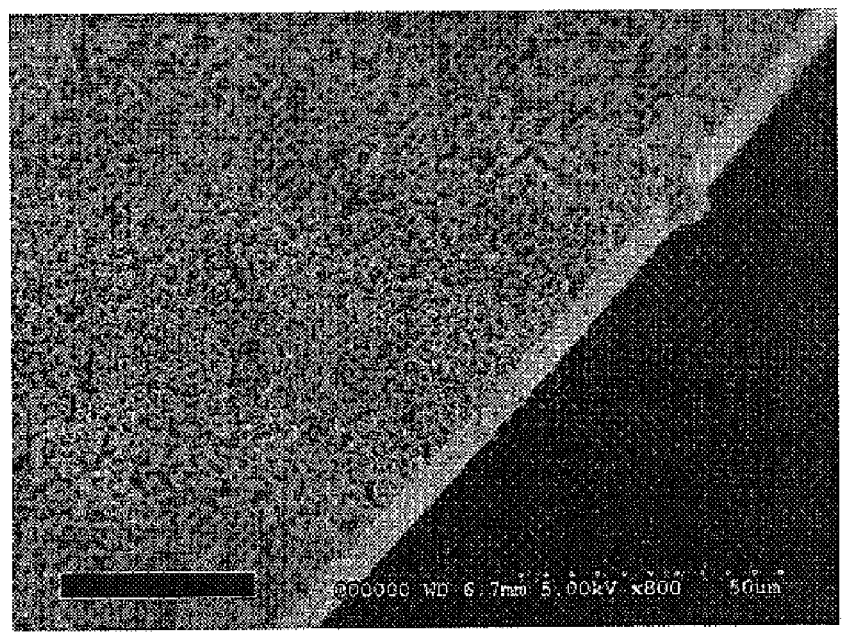
FIG. 22 is a SEM micrograph of the portion of glass removed in the view shown in FIG. 21.
Figure 23:
FIG. 23 is a SEM micrograph shown in expanded view of the edge of the glass portion in FIG. 22.
Figure 24:
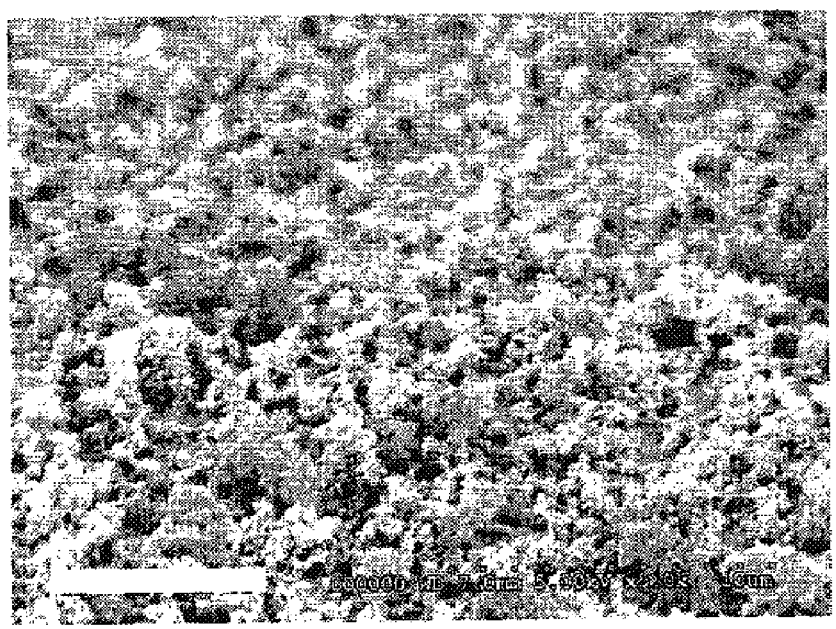
FIG. 24 is a SEM micrograph of the remaining release layer after a portion of glass is separated from the substrate.

The glass layer could be easily separated from the substrate by mechanically fracturing the release layer. This was demonstrated with a piece of tape that was placed on the glass and pulled up. A section of glass was removed with the tape. A SEM micrograph was taken of the edge of the glass. This is shown in FIG. 21 with the top surface of the glass labeled T, the edge of the glass labeled E and the fractured release layer labeled R. A SEM micrograph of the release layer is shown in FIG. 22 with the remains of the fractured release layer shown on top. An expanded side view is shown in FIG. 23 in which a portion of the release layer is shown on top of the densified glass layer. A further expanded view of the release layer is shown in FIG. 24.

The embodiments above are intended to be illustrative and not limiting. Additional embodiments are within the claims. Although the present invention has been described with reference to preferred embodiments, workers skilled in the art will recognize that changes may be made in form and detail without departing from the spirit and scope of the invention.

What is claimed is:

1. A structure comprising a substrate having a surface, a release layer on the surface of the substrate and a first uniform optical material on top of the release layer, the release layer comprising partly sintered powders.

2. The structure of claim 1 wherein the first uniform optical material comprises a glass.

3. The structure of claim 1 wherein the first uniform optical material comprises a silica glass.

4. The structure of claim 3 wherein the silica glass is doped.

5. The structure of claim 1 wherein the first uniform optical material comprises a crystalline material.

6. The structure of claim 1 wherein the substrate comprises elemental silicon.

7. The structure of claim 1 wherein the release layer has the same chemical composition as the first uniform optical material.

8. The structure of claim 1 wherein the release layer has a different chemical composition from the first uniform optical material.

9. The structure of claim 1 wherein the release layer comprises $SiO_2$.

10. The structure of claim 1 wherein the release layer has an average thickness along the substrate surface from about 0.5 microns to about 30 microns.

11. The structure of claim 1 wherein the first uniform optical material has an average thickness along the release layer from about 1 micron to about 50 microns.

12. The structure of claim 1 wherein the first uniform optical material has an average thickness along the release layer from about 3 micron to about 20 microns.

13. The structure of claim 1 wherein the release layer and the first uniform optical material extend over no more than about 50 percent of the area of the substrate surface.

14. The structure of claim 1 further comprising a second uniform optical material in contact with the first material, wherein the second uniform optical material has different optical properties from the lint uniform optical material.

15. The structure of claim 14 wherein the release layer is located between the second uniform optical material and the substrate.

16. A method for transferring a layer of uniform material to a receiving substrate surface, the method comprising applying separation forces to transfer to the receiving substrate an uniform material from a transfer material in contact with the receiving substrate surface, the transfer material comprising the structure of claim 1 wherein the layer of transferred material comprises the first uniform material of the transfer material.

17. The method of claim 16 wherein the separation forces comprise heat.

18. The method of claim 17 wherein the separation forces comprise shear.

19. The method of claim 17 wherein the separation forces are supplied with light.

20. A structure comprising a substrate having a surface and an optical material having an average thickness from about 3 microns to about 50 microns, which is located on a substrate surface, wherein the optical material is free of stress and wherein the optical material comprises metal/metalloid oxides, metal/metalloid carbides, metal/metalloid nitrides, metal/metalloid sulfides, doped metal/metalloid compounds or crystalline metal/metalloid compounds.

21. The structure of claim 20 wherein the optical material is free of birefringence.

22. The structure of claim 20 wherein the optical material comprises a silica glass.

23. The structure of claim 22 wherein the substrate comprises silicon.

24. The structure of claim 20 wherein a release layer is between the silica glass and the silicon.

25. The structure of claim 20 wherein the substrate comprises a release layer, which is contacting the optical material.

26. A method for forming a structure with a uniform material on a substrate with a release layer between the uniform material and the substrate, the method comprising:

1) depositing a layer of powder on a substrate, the powder in the layer having a lower sintering temperature at the top than the powder in the layer adjacent the substrate; and 2) heating the powder layers to convert the top of the powder layer to a uniform material while the powder layer adjacent the substrate becomes a release layer.

27. The method of claim 26 wherein the powder layer adjacent the substrate comprises silicon dioxide.

28. The method of claim 26 wherein the powder layer comprises doped silicon dioxide.

29. The method of claim 26 wherein the heating is performed in an oven.

30. The method of claim 26 wherein the powder layer is deposited by light reactive deposition.

31. A method for forming a uniform material on a substrate surface with a release layer between the uniform material and the substrate, the method comprising heating a powder coating on the surface of the substrate from above to produce the uniform material the surface and a release layer between the substrate surface and the uniform optical material.

32. The method of claim 31 wherein the powder has uniform composition.

33. The method of claim 31 wherein the composition of the powder changes from the surface of the substrate to the surface of the powder layer.

34. The method of claim 33 wherein the change in composition is gradual.

35. The method of claim 33 wherein the change in composition is abrupt.

36. A substrate-less planar optical structure comprising a plurality of optical glass layers with different indices-of-refraction from each other, an average thickness through the entire structure being no more than about 1 mm.

37. The substrate-less planar optical structure of claim 36 wherein at least one layer is localized with respect to the planar extent of the layer.

38. The substrate-less planar optical structure of claim 36 wherein the plurality of optical layers include a waveguide.

39. The substrate-less planar optical structure of claim 36 wherein the plurality of optical layers includes integrated optical devices.

40. A structure comprising a substrate having a surface, a release layer on the surface of the substrate and a first uniform optical material on top of the release layer, the release layer including powders or partly sintered powders, wherein the release layer has the same chemical composition as the first uniform material.

41. The substrate-less planar optical structure of claim 36 wherein a planar projection of the structure with a maximum surface area has a minimum edge-to-edge distance of a segment passing through the center of the projected area of at least about 1 cm.

* * * * *